US010509934B1

(12) United States Patent
Reynolds

(10) Patent No.: US 10,509,934 B1
(45) Date of Patent: Dec. 17, 2019

(54) METHODS AND APPARATUS FOR IMPROVING QR CODE LOCATOR DETECTABILITY AND/OR FINDING THE CORNERS OF A LOCATOR PATTERN

(71) Applicant: Accusoft Corporation, Tampa, FL (US)

(72) Inventor: John Reynolds, Riverview, FL (US)

(73) Assignee: Accusoft Corporation, Tampa, FL (US)

( * ) Notice: Subject to any disclaimer, the term of this patent is extended or adjusted under 35 U.S.C. 154(b) by 51 days.

(21) Appl. No.: 15/886,734

(22) Filed: Feb. 1, 2018

(51) Int. Cl.
  *G06K 7/14* (2006.01)
(52) U.S. Cl.
  CPC ......... *G06K 7/1452* (2013.01); *G06K 7/1417* (2013.01); *G06K 7/1434* (2013.01)
(58) Field of Classification Search
  None
  See application file for complete search history.

(56) References Cited

U.S. PATENT DOCUMENTS 9,501,681 B1 * 11/2016 Wang .................. G06K 7/1443
2007/0069026 A1 * 3/2007 Aoyama .................. G06K 7/14
  235/462.09

* cited by examiner

*Primary Examiner* — Kristy A Haupt
(74) *Attorney, Agent, or Firm* — Straub & Straub; Michael P. Straub; Stephen T. Straub

(57) ABSTRACT

Various features relate to processing a scanned image to facilitate accurate locator pattern identification and/or detection of the corner locations of the locator pattern. In some embodiments to facilitate the identification of corner points the scanned image is processed to reduce the effect of noise and/or other damage on the subsequent location identification process. Individual white pixels which have black pixels on four sides are converted to black as part of the processing while multiple white pixels adjacent each other are left unaltered. In some embodiments processing does not alter the color of black pixels. Corner points of the locator pattern are identified through additional processing and identification of line segments satisfying an expected black, white, black, white, black segment portion ratio.

20 Claims, 16 Drawing Sheets

METHODS AND APPARATUS FOR IMPROVING QR CODE LOCATOR DETECTABILITY AND/OR FINDING THE CORNERS OF A LOCATOR PATTERN

FIELD

Various embodiments are directed to methods and apparatus for locating target patterns within an image, and more, particularly to efficiently locating QR code finder patterns and/or QR code alignment patterns in an image which may have noise and/or been damaged due to scanning errors and/or other issues.

BACKGROUND

First developed in 1994, QR codes are a two-dimensional barcode type that has come into much popularity with the recent ubiquity of mobile devices. Featuring a robust error correction mechanism and a number of structurally identifying features, this barcode type has been designed around ease of recognition. The most visually striking features of QR codes are the concentric square finder patterns and alignment patterns. These patterns serve as boundary markers and indicate locations within the code to accurately align the barcode's modules.

A QR code normally includes multiple locator patterns, e.g., three, one in each of three different corners of a square QR code. While locater pattern redundancy is helpful when trying to determine the boundaries of a QR code, in many cases a QR code may be damaged or a scan of the code may be noisy, e.g., due to some black areas being interpreted as white and visa versa. Unfortunately, noise is often present in scanned QR codes even if the original code is relatively intact. In the context of the present application a scan maybe a image captured by a camera such as a camera cell phone or an image captured by a scanner which sequentially captures portions of an image of an object such as a document. Thus scan is used to generally refer to a captured image of an object such as a page of a document or product packaging regardless of the device used to capture the image. Cameras and scanners normally include an optical sensor often simply referred to as a sensor which converts captured light to electrical signals which correspond to pixel values. Thus the output of a sensor is often a set of pixel values of a captured image, e.g., the scanned image. During image capture sensor noise may cause some pixels of the scan to assume a value different from what the actual pixel value should be.

The processing of a noisy scan and/or a scan of a damaged QR code to locate one or more finder patterns presents several technical problems. One technical problem is how to process a lossy or damaged image to make it easier to find a locator pattern and/or find the position of the corners of the locator pattern. It would be desirable if one or more methods and/or apparatus could be developed to process a damaged or noisy QR code to facilitate accurate identification of a QR locator pattern and its corners even if the damaged or noisy QR code can not be fully repaired. Another technical problem is how to determine the position and/or corners of a QR locator pattern when it is damaged which is often the case.

In view of the above discussion it should be appreciated that there is a need for methods and/or apparatus which can be used to process scanned images, e.g., of QR codes, to enhance the probability of correct identification and/or location of a QR code finder pattern. In addition there is a need for methods and/or apparatus which can find the position of a noisy or otherwise damaged QR locator pattern and/or the corners of such a QR locator pattern. While it would be desirable if the methods and apparatus could address multiple technical problems of the type described, even if one or more of the problems can be addressed it would be useful since increasing the reliability of QR locator pattern identification and location determination can facilitate successful reading and/or recovery of information communicated by a QR code in which the QR location pattern is located.

SUMMARY

Methods and apparatus for processing a locator pattern or patterns in a QR code, e.g., a scanned QR code, are described. Various features relate to the processing of a scanned image to facilitate accurate locator pattern identification and/or detection of the corner locations of the locator pattern. Other features relate to the processing of a damaged locator pattern, which may or may not have been processed to reduce the effect of noise or other damage, to determine the location of the corners of the QR locator pattern. The scanned image of a QR code may be generated by using a camera or scanner device to generate an image of a QR code.

In some embodiments to facilitate the identification of corner points the scanned image is processed to reduce the effect of noise and/or other damage on the subsequent location identification process. In some embodiments individual white pixels which have black pixels on four sides are converted to black as part of the processing while multiple white pixels adjacent each other are left unaltered. In some embodiments processing does not alter the color of black pixels. This minimizes the processing operations performed while still addressing the effect of individual white pixels in a black region which have been found to be a more common error than an individual black pixel in a white region. Thus, the effect of local noise and/or other local damage, e.g. individual pixel level damage, is reduced through the processing used in some but not all embodiments.

Once a scanned image including a QR locator pattern has been processed, the corner points of the locator pattern are identified through additional processing and identification of line segments satisfying the expected 1:1:3:1:1 ratio of black, white, black, white, black segments expected in the center region of the locator pattern.

The position information about the corners of the locator pattern can be, and sometimes are, used to facilitate reading of the information communicated by the QR code in which the QR locator pattern is located.

By addressing one or more of the technical problems associated with QR code locator pattern identification and corner position determination, the probability that useful information communicated by a QR code can be recovered and used by a device, e.g., cell phone which scanned the pattern, or a person who used a device to scan a QR pattern is increased.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 7 shows how FIGS. 7A and 7B can be combined to form a complete flow chart which shows a method of processing identified line segments which can be used in the method of FIG. 6.

DETAILED DESCRIPTION

Figure 1:
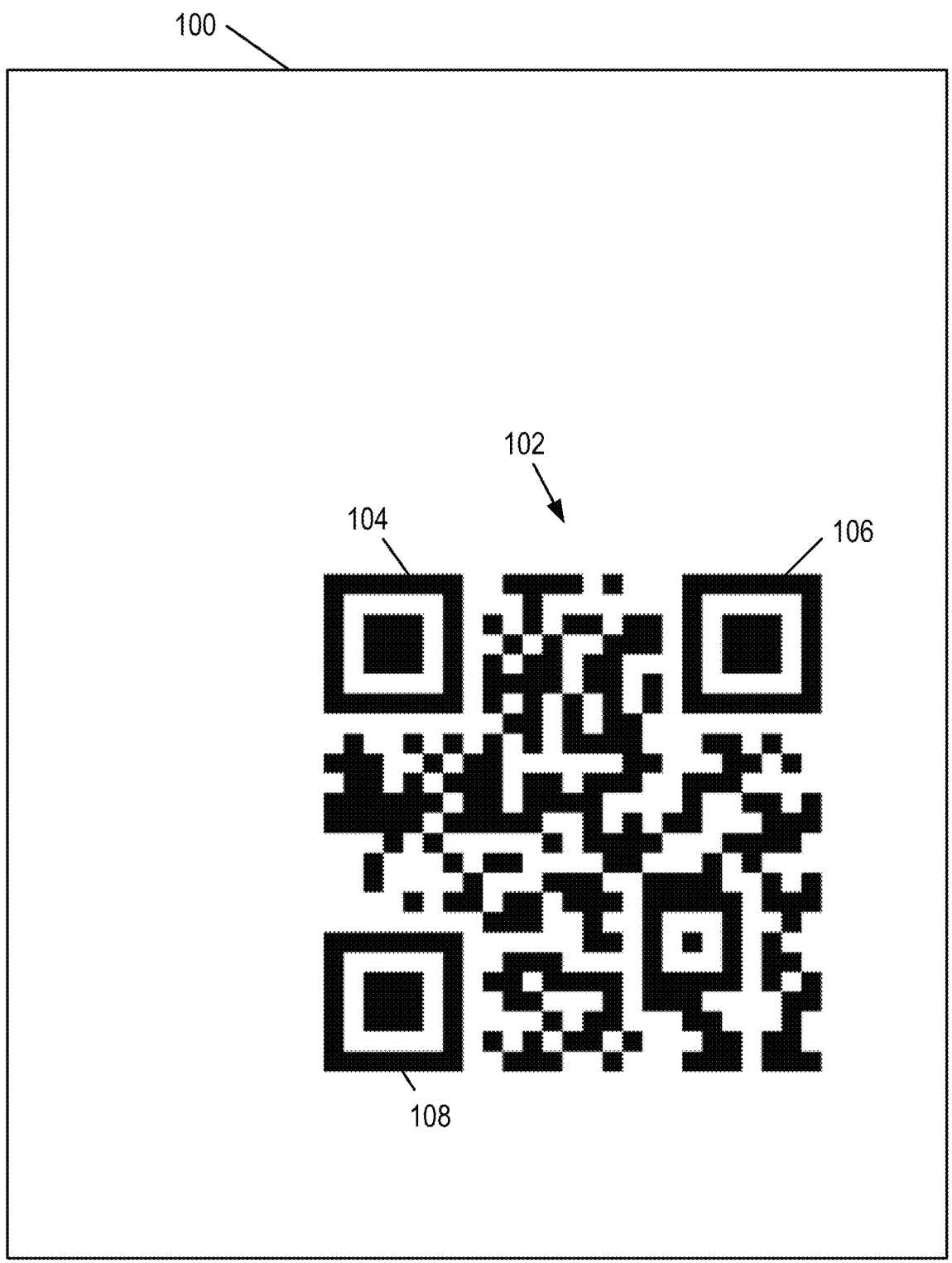
FIG. 1 illustrates an exemplary object, e.g., page of a document, with a QR code on it which includes three QR code locator patterns also sometimes referred to as finder or alignment patterns.

FIG. 1 illustrates an exemplary object 100, e.g., page of a document or a portion of an object such as a package, with a QR code 102 on the exemplary object 100. The QR code 102 includes three QR code locator patterns 104, 106, 108 also sometimes referred to as finder or alignment patterns. The shape of the QR code locator patterns includes a black, white, black, white, black pattern which is symmetrical through the center of the locator pattern in both the horizontal and vertical dimensions.

Figure 2:
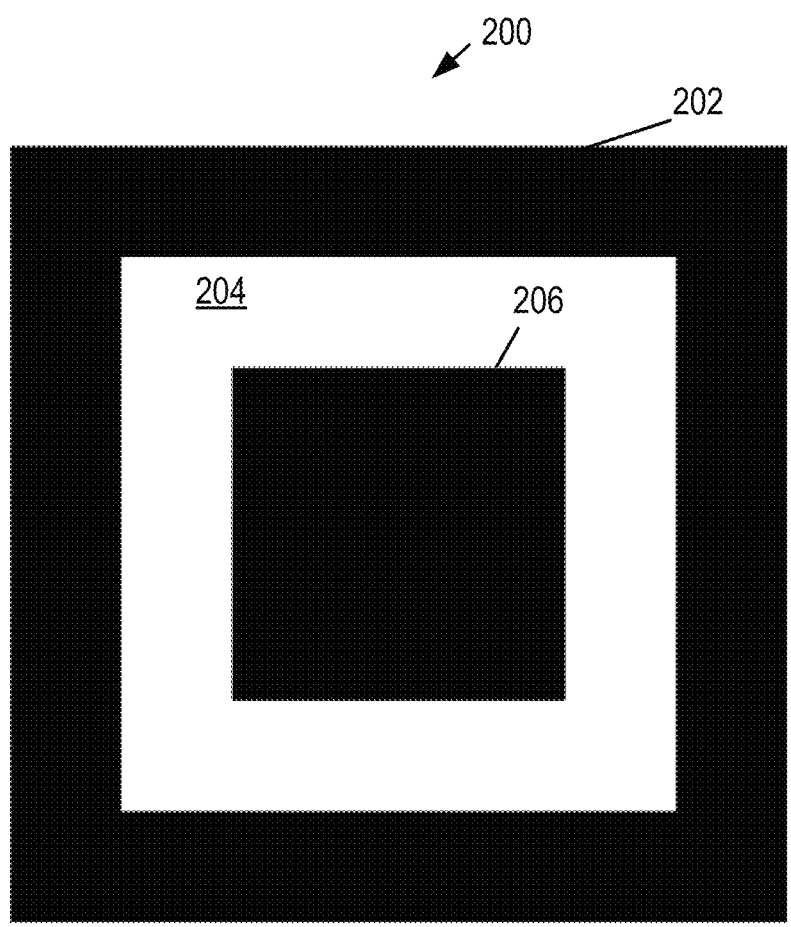
FIG. 2 illustrates an exemplary undamaged QR code locator pattern including an expected black, white, black, white, black pattern that will be encountered by a horizontal or vertical line passing through the center of the locator pattern.

FIG. 2 illustrates an exemplary undamaged QR code locator pattern 200 including an expected black, white, black, white, black pattern formed from the outer black region 202, inner white region 204 and center black region 206. A vertical or horizontal slice of the locator pattern 200 which goes through the three regions (202, 204, 206) includes black, white, black, white and black portions with a segment length ratio of 1:1:3:1:1. Such a pattern will be encountered by a horizontal or vertical line passing through the center of the locator pattern 200. Exemplary undamaged locator pattern 200 is, e.g., one of the QR code locator patterns 104, 106, 108.

Figure 3:
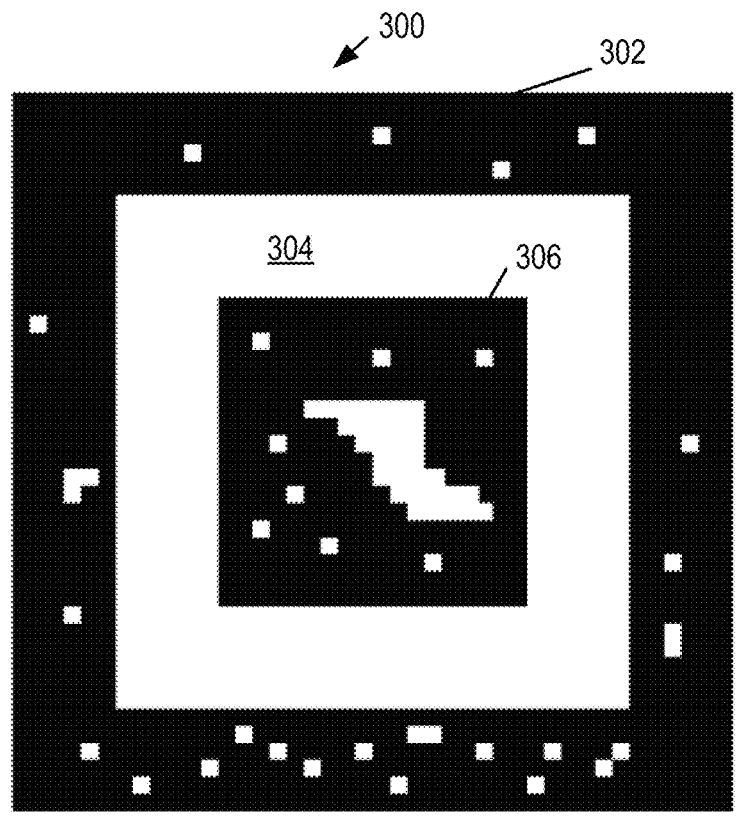
FIG. 3 illustrates an exemplary damaged, e.g., noisy, QR code locator pattern that may be the result of scanning an intact or partially damaged QR code.

FIG. 3 illustrates an exemplary damaged, e.g., noisy, QR code locator pattern 300 that may be the result of scanning an intact QR code locator pattern, e.g., QR code locator pattern 104 or a partially damaged QR code locator pattern, e.g., such as may occur when the object 100 shown in FIG. 1 is scanned by a cell phone or other device. In the FIG. 3 example the damaged locator pattern 300 includes primarily black region 302, white region 304 and a primarily black center regions 306. As a result of noise, reflections and/or other issues the primarily black regions 302, 306 include portions which are white due to errors or damage to the QR code locator pattern which was scanned. For a variety of reasons, black areas are likely to include one or more white pixels when scanned. In the FIG. 3 example each small box represents a pixel. Note that while some errors result in multiple adjacent white pixels being located together many of the errors such as those due to sensor noise will tend to be a single pixel in size. While a single pixel error may seem small, when trying to determine if a slice, e.g., line, of the pattern satisfies the expected ratio of black, white, black, white, black segment lengths the white pixels may interrupt a line causing the expected pattern not to be satisfied for a given horizontal or vertical line. For a variety of reasons black errors tend to be less common on white areas than white errors in the black areas. The processing performed in some but not necessarily all embodiments takes this into consideration treating discrete white pixels differently than discrete black pixels when found in an area of the other color.

Figure 4:
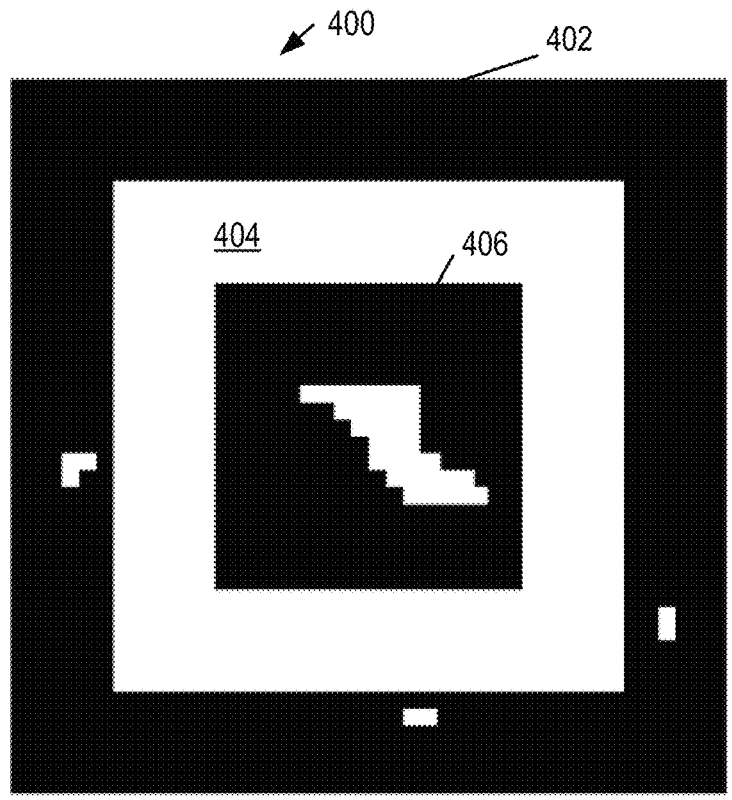
FIG. 4 illustrates the result of processing the exemplary damaged locator pattern of FIG. 3 in accordance with one feature of the invention to increase the probability of proper detection of the locator pattern and the corresponding corner points of the locator pattern.

FIG. 4 illustrates the result of processing the exemplary damaged locator pattern 300 of FIG. 3 in accordance with one feature of the invention to increase the probability of proper detection of the locator pattern and the corresponding corner points of the locator pattern. In accordance with the exemplary embodiment shown in FIG. 3, individual white pixels are converted to black if the pixels immediately above, below, to the left and to the right of a white pixel are black. Multiple white pixels which are touching each other are left unchanged. The color of black pixels is left unchanged in one such embodiment even if they are located in predominately white regions.

The described processing of the damaged locator pattern 300 shown in FIG. 3 results in the processed locator pattern 400 shown in FIG. 4 which includes outer primarily black region 402, inner white region 404 and dark center region 406. Note that some of the white areas which are due to damage such as noise or other errors remain. However, a comparison of FIG. 4 to FIG. 3 shows that the number of vertical and horizontal slices, e.g., lines, passing through the center portion 406 which will satisfy the expected black, white, black, white, black segment ratio of 1:1:3:1:1 is significantly increased in the processed locator pattern 400 of FIG. 4 as compared to the locator pattern 300 shown in FIG. 3.

Figure 5:
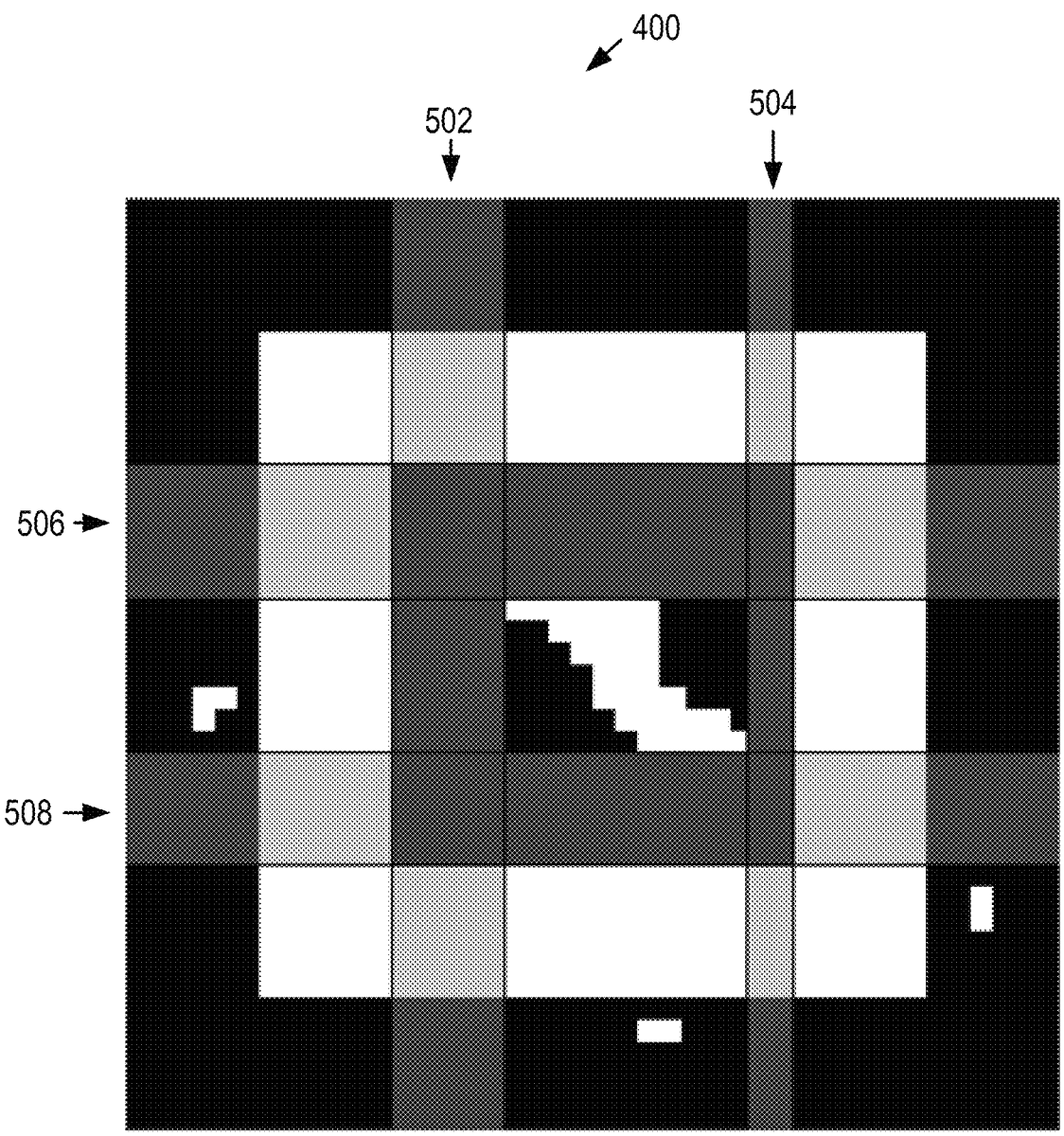
FIG. 5 illustrates areas, e.g., horizontal and vertical lines, of the processed locator pattern of FIG. 4 which are identified and used in determine the location and corner points of the locator pattern shown in FIG. 4 in some embodiments.

FIG. 5 illustrates areas, e.g., horizontal line areas 506, 508 and vertical line areas 502, 504, of the processed locator pattern 400 of FIG. 4 which satisfy the expected segment ratio. In some embodiments as will be explained below the line segments of these areas are identified and used in determining the location and/or corner points of the locator pattern 400 shown in FIG. 4 and which indicates what should be the corner points of the damaged locator pattern 300 of FIG. 3.

Figure 6A:
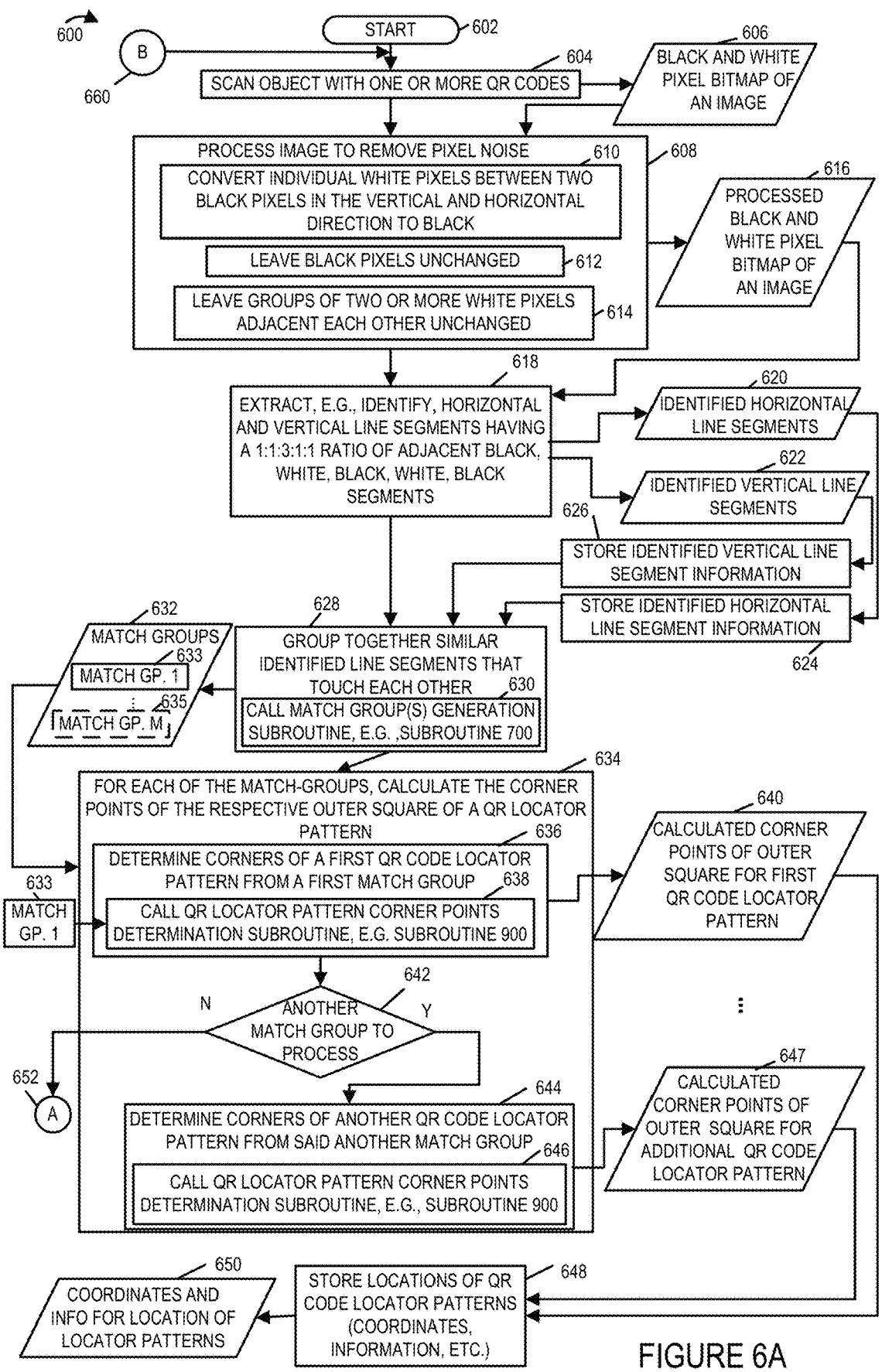
FIG. 6A is a first part of the flow chart of FIG. 6.
Figures 6, 6A, 6B:
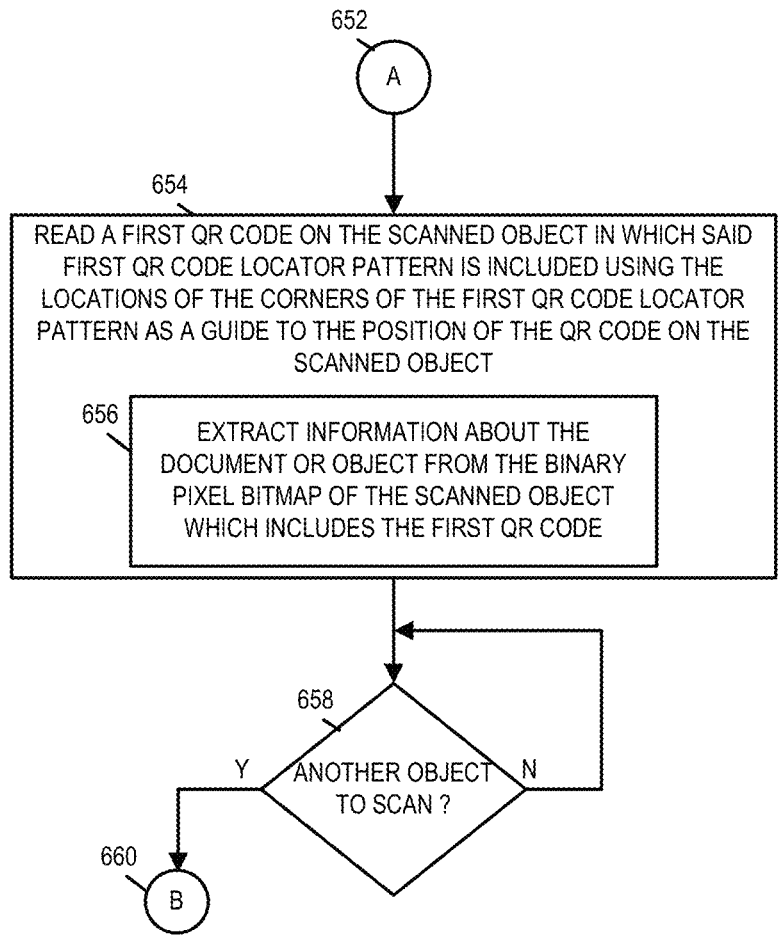
FIG. 6 shows how FIGS. 6A and 6B can be combined to form a complete flow chart which shows a method of processing a scanned image to enhance QR code locator pattern detection and find corner locations of a QR code locator pattern in accordance with one exemplary embodiment.
FIG. 6B is a second part of the flow chart of FIG. 6.

FIG. 6, comprising the combination of FIG. 6A and FIG. 6B, is a flowchart 600 of an exemplary method of processing image data in accordance with an exemplary embodiment. Operation starts in step 602, in which an image processing system or image processing device is powered on and initialized. Operation proceeds from step 602 to step 604. In step 604 an object with one or more QR codes is scanned. The result of step 604 is a black and white pixel bitmap of an image 606. Operation proceeds from step 604 to step 608. In step 608 the image is processed to remove pixel noise. Black and white pixel bitmap of the image 606 is an input to step 608 and a processed black and white pixel bitmap of the image 616 is produced in step 608 and output. Step 608 includes one or more or all of steps 610, 612 and 614. In step 610 individual white pixels between two black pixels in the vertical and horizontal direction are converted to black. Thus in step 610, individual white pixels which have immediately adjacent black pixels on four sides, e.g., left, right, top and bottom, are replaced with black pixels. In step 612 black pixels are left unchanged. In step 614, groups of two or more white pixels adjacent each other are left unchanged. Operation proceeds from step 608 to step 618.

In step 618, horizontal and vertical line segments having a 1:1:3:1:1 ratio of adjacent black, white, black, white, black segments are extracted, e.g. identified. In some embodiments, step 618 includes a sub-step in which horizontal line segments having a 1:1:3:1:1 ratio of adjacent black, white, black, white, black segments are identified, and a sub-step in which vertical line segments having a 1:1:3:1:1 ratio of adjacent black, white, black, white, black segments are identified. The input to step 618 is the processed black and white pixel bitmap of the image 616, and the output from step 618 are identified horizontal line segments 620 and identified vertical line segments 622. In step 624, identified horizontal line segment information is stored, and in step 626 identified vertical line segment information is stored. Exemplary identified horizontal line segment information for an identified horizontal line segment includes, e.g., the location of the start of the line segment, e.g., leftmost coordinate, the location of the end of the line segment, e.g., rightmost coordinate, the length of the line segment, and the length of the center black segment within the line segment. Exemplary identified vertical line segment information for an identified vertical line segment includes, e.g., the location of the top of the line segment, the location of the bottom of the line segment, the length of the line segment, and the length of the center black segment within the line segment. Operation proceeds from step 618, 624, and 626 to step 628.

In step 628 similar identified line segments that touch each other are grouped together to form one or more match groups. Step 628 includes step 630 which is a call of a match group(s) generation subroutine, e.g., subroutine 700 of FIG. 7. The identified vertical line segment information and the identified vertical line segment information are used as inputs to step 628, and the information is made available to and used by the match group(s) generation subroutine. The match group(s) generation subroutine returns one or more match groups, each match groups corresponding to a QR code locator pattern. In various embodiments, each match groups includes at least 3 identified horizontal line segments and at least 3 identified vertical line segments. The output from step 628 is match groups information 632, which includes match group 1 information 633, . . . , match group M information 635. In one example there are 3 match groups returned, one for each QR code locator pattern in a scanned QR code.

Operation proceeds from step 628 to step 634. In step 634, for each of the match groups, the corner points of the respective outer square of a QR locator pattern are calculated. Step 634 includes step 636, 642, and 644. In step 636 the corners of a first QR code locator pattern are determined from the first match group 633. Step 636 includes step 638 in which a call is made to a QR code locator pattern corner points determination subroutine, e.g., subroutine 900 of FIG. 9, which performs the corner points determination and returns calculated corner points of the outer square for the first QR code locator pattern 640. In step 648 the location, e.g., coordinates, of the first QR code locator pattern is stored in information 650.

Operation proceeds from step 636 to step 642. In step 642 a determination is made as to whether or not there is another match group in match groups information 632 to be processed. If there is another match group to process, then operation proceeds from step 642 to step 644. In step 644 the corners of another QR code locator pattern are determined from the another match group, e.g., match group M 635. Step 644 includes step 646 in which a call is made to a QR code locator pattern corner points determination subroutine, e.g., subroutine 900 of FIG. 9, which performs the corner points determination and returns calculated corner points of the outer square for the another QR code locator pattern 647. In step 648 the location, e.g., coordinates, of the another QR code locator pattern is stored in information 650.

If in step 642, the determination is that there is not another match group to process then operation proceeds from step 642, via connecting node A 642 to step 654. In step 654, a first QR code on the scanned object, in which said first QR code locator pattern is included, is read using the location of the corners of the first QR code locator pattern as a guide to the position of the QR code on the scanned object. Step 654 includes step 656 in which information is extracted about the document or object from the binary bitmap of the scanned object which includes the first QR code. Operation proceeds from step 654 to step 658.

In step 658, a check is made as to whether or not another object is to be scanned at this time. If another object is to be scanned, then operation proceeds from step 658, via connecting node B 660, to step 604. However, if another object is not to be scanned the operation proceeds to the input of step 658 for another check, at a later time.

Figure 7A:
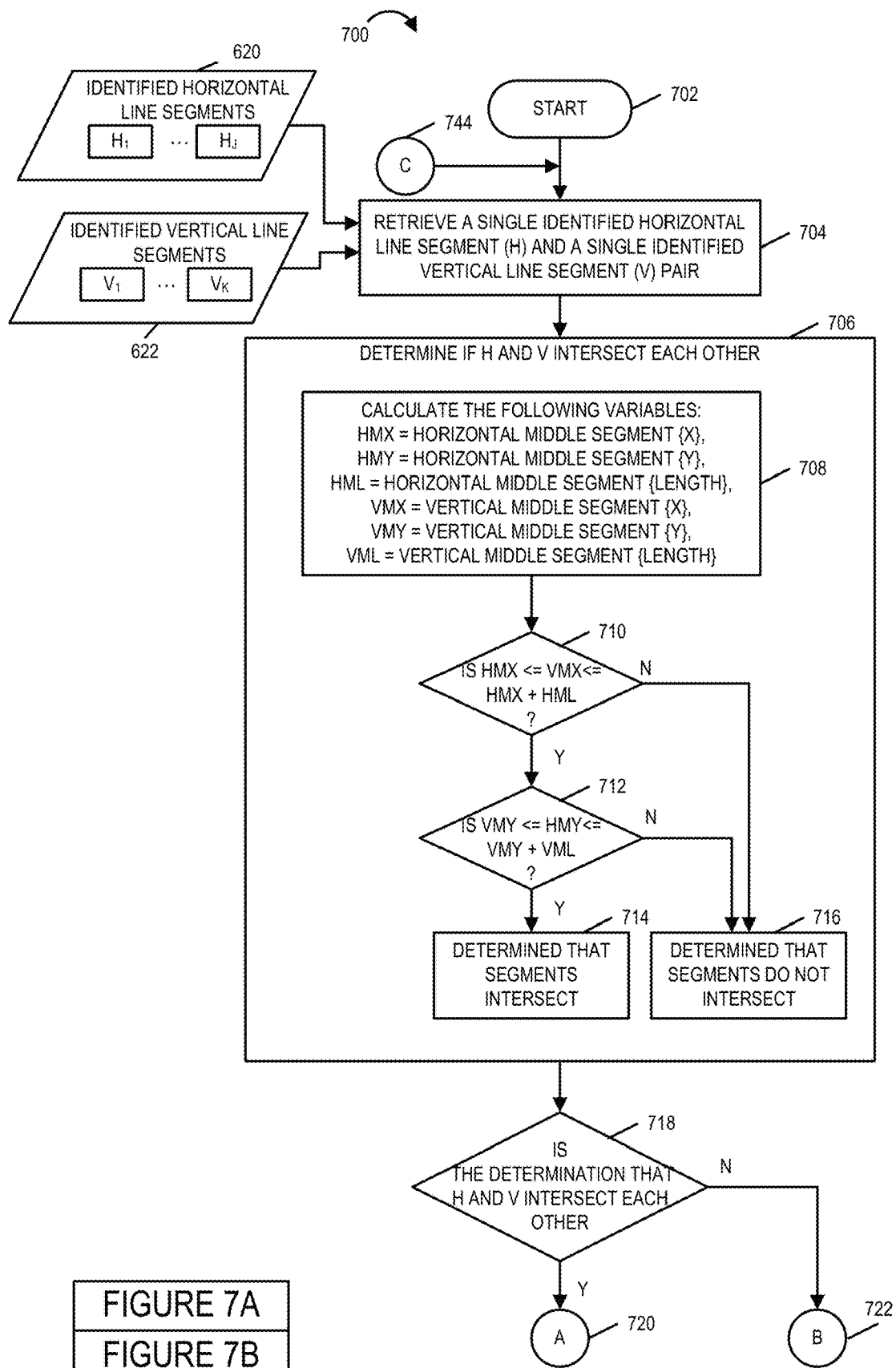
FIG. 7A is a first part of the flow chart of FIG. 7.
Figure 7B:
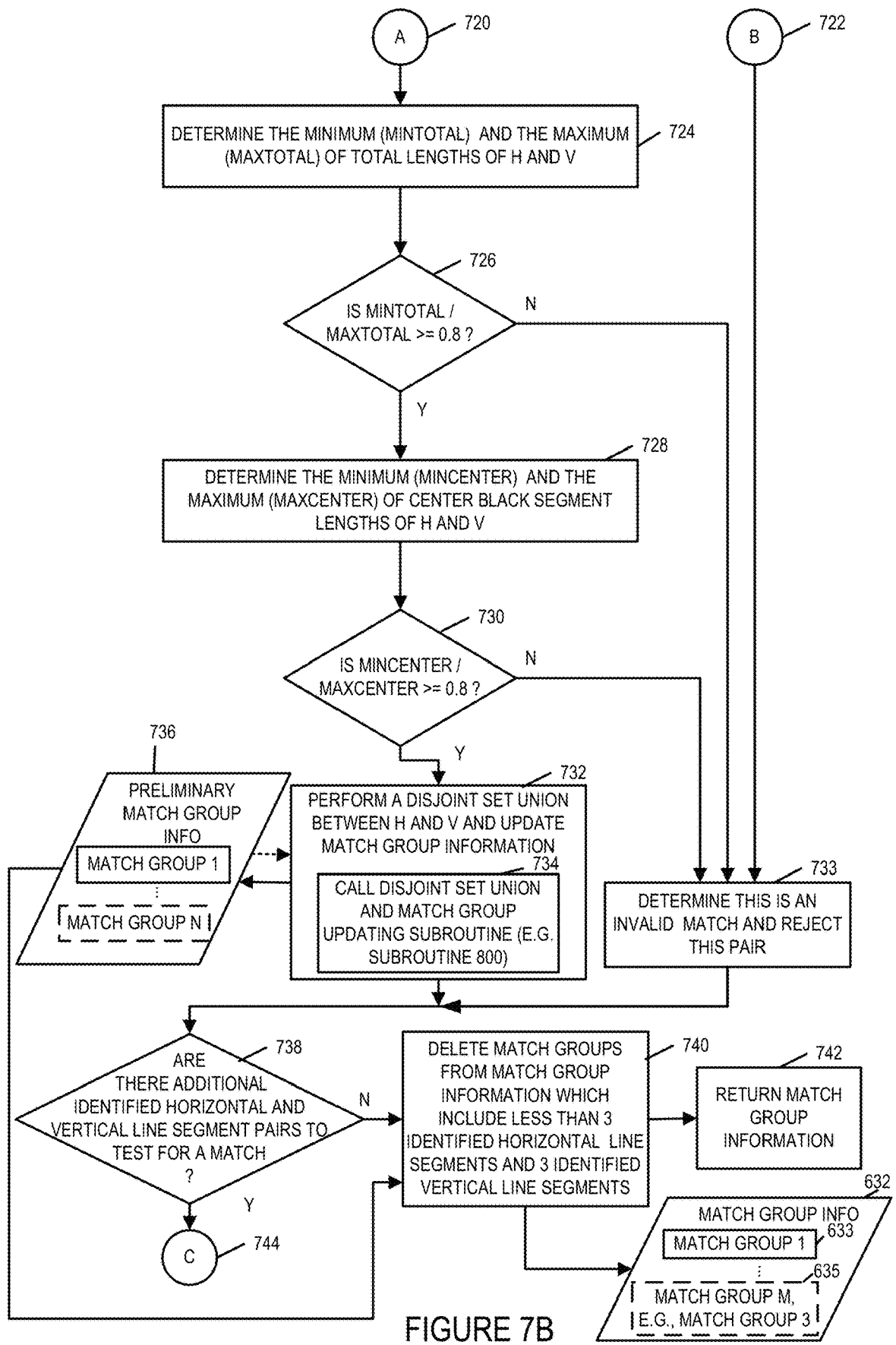
FIG. 7B is a second part of the flow chart of FIG. 7.

FIG. 7, comprising the combination of FIG. 7A and FIG. 7B, is a flowchart of an exemplary method of generating match groups in accordance with an exemplary embodiment. In some embodiments, the method of flowchart 700 is implemented as a subroutine which is called, which uses identified horizontal line segment information and identified vertical line segment information as input, and which returns one or more generated match groups, e.g., each returned match group including 3 or more identified horizontal line segments and 3 or more identified vertical line segments, a returned match groups corresponding to a QR code locator pattern. Operation of the exemplary method starts in step 702 and proceeds to step 704. In step 704, a single identified horizontal line segment H and a single identified vertical line segment V, making a line segment pair, are retrieved from stored identified horizontal line segments 620 and stored identified vertical line segments 622, respectively. For example during, the first iteration identified horizontal line segment H1 and identified vertical line segment V1 are retrieved for processing. During different iterations, different pairs of one identified horizontal line segment and one identified vertical line segment are retrieved. Operation proceeds from step 704 to step 706.

In step 706 a determination is made as to whether or not identified line segment H and identified line segment V intersect each other. Step 706 uses location information about the identified line segment H and location information about the identified line segment V to determine if H and V intersect at all. Step 706 includes steps 708, 710, 712 714 and 716. In step 708, the following variable are calculated: HMX=horizontal middle segment {X}; HMY=horizontal middle segment {Y}; HML=horizontal middle segment {Length}; VMX=vertical middle segment {X}; VMY=vertical middle segment {Y}; VML=vertical middle segment {Length}. Operation proceeds from step 708 to step 710.

In step 710 a check is performed to determine if VMX is both: (i) greater than or equal to HMX and (ii) less than or equal to HMX+HML. If those conditions are not satisfied then operation proceeds from step 710 to step 716 in which it is determined that the segments H and V, which are being tested, do not intersect. However if the check of step 710 determines that the conditions are satisfied, then operation proceeds from step 710 to step 712. In step 712 a check is performed to determine if HMY is both: (i) greater than or equal to VMY and (ii) less than or equal to VMY+VML. If those conditions are not satisfied then operation proceeds from step 712 to step 716 in which it is determined that the segments H and V, which are being tested, do not intersect. However if the check of step 712 determines that the conditions are satisfied, then operation proceeds from step 712 to step 714, in which it is determined that the segments H and V, which are being tested, intersect. Operation proceeds from step 706 to step 718.

In step 718, if the determination is that line segment H and line segment V intersect each other then operation proceeds, via connecting node A 720 to step 724. However, if the determination is that that line segment H and line segment V do not intersect one another, then operation proceeds from step 718, via connecting node B 722, to step 733, in which a determination is made that this is an invalid match and the pair is rejected.

Returning to step 724, in step 724, the minimum, referred to as MINTOTAL, and the maximum, referred to as MAXTOTAL, of the total length of line segments H and V are determined. Operation proceeds from step 724 to step 726. In step 726, MINTOTAL is divided by MAXTOTAL and a check is made to determine if the value obtained is greater than or equal to 0.8. Step 726 compares the ratio of the smallest of the two total lengths to the largest of the two total lengths. If the ratio is greater than or equal to 80%, then the test passes. For example, if the identified horizontal line segment H's total length is 20 pixels long and the identified vertical line segment V's total length is 18 pixels long, the test would pass since 18/20=0.9 (90%). As another example, if the identified horizontal line segment H's total length is 15 pixels long and the identified vertical line segment V's total length is 20 pixels long, the test would not pass since 15/20=0.75 (75%) and does not meet or exceed 80%.

If the determination of step 726, is that the ratio is not greater than 0.8, then operation proceeds to step 733, in which a determination is made that this is an invalid match and the pair is rejected. However, if the determination of step 726, is that the ratio is greater than or equal to 0.8, e.g. the ratio is between 0.8 and 1, then the pair has satisfied the total length ratio test condition and operation proceeds to step 728.

In step 728, the minimum, referred to as MINCENTER, and the maximum, referred to as MAXCENTER, of the center black segments' lengths of line segments H and V are determined. In step 730, MINCENTER is divided by MAXCENTER and a check is made to determine if the value obtained is greater than or equal to 0.8. If the determination of step 730, is that the ratio is not greater than 0.8, then operation proceeds to step 733, in which a determination is made that this is an invalid match and the pair is rejected. However, if the determination of step 730, is that the ratio is greater than or equal to 0.8, e.g. the ratio is between 0.8 and 1, then the pair has satisfied the center length ratio test condition and operation proceeds to step 732.

In step 732 a disjoint set union between line segment H and line segment V is performed and match group information is updated. Step 732 includes step 734, in which a call is made to a disjoint set union and match group updating subroutine, e.g., subroutine 800.

Figure 8:
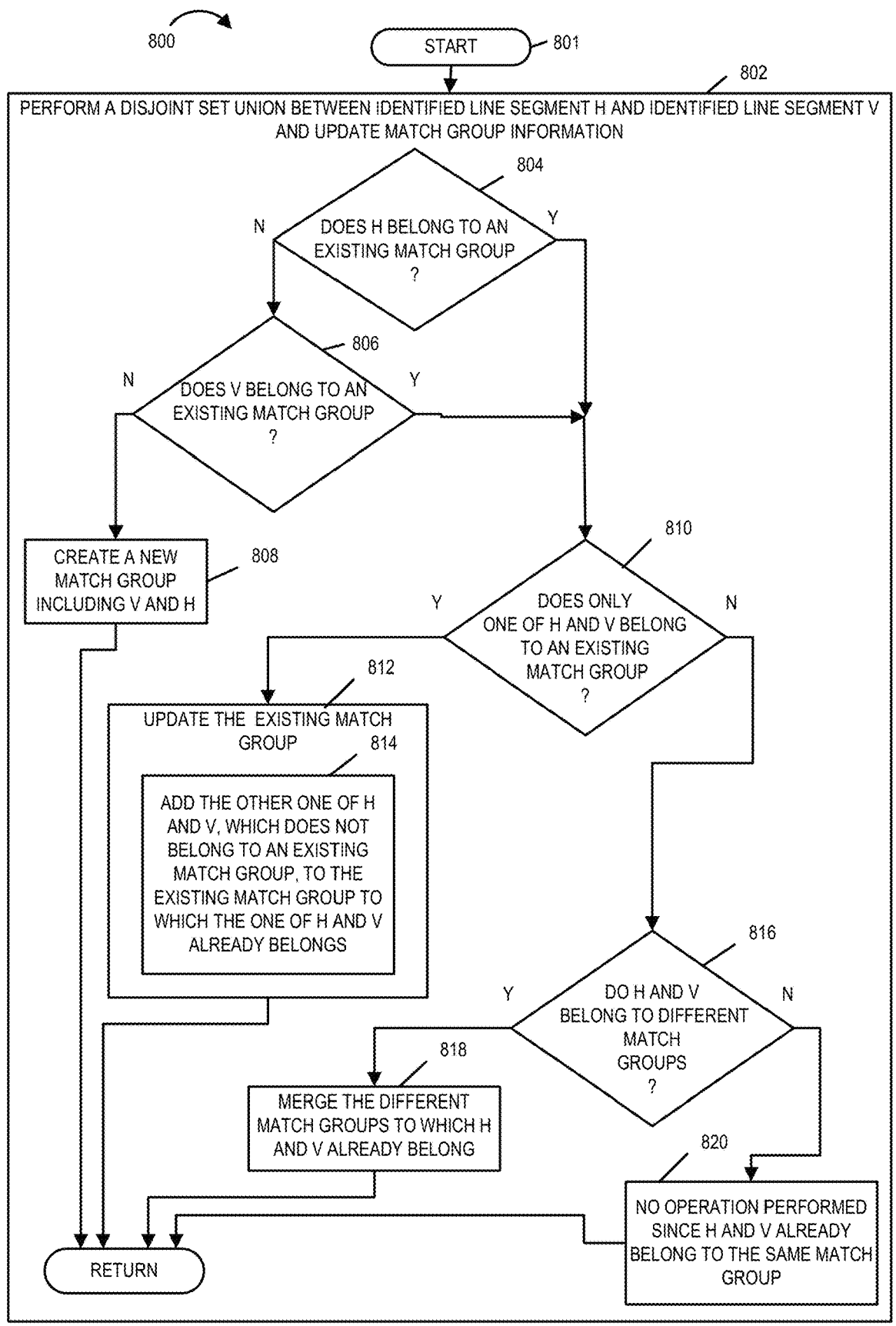
FIG. 8 is a flow chart which may be implemented to perform the disjoint set union operation of step 732 of the flow chart shown in FIG. 7.

FIG. 8 is a flowchart of an exemplary disjoint union set and match group updating method 800 in accordance with an exemplary embodiment. In some embodiments, the method of flowchart 800 of FIG. 8 is implemented as a subroutine, which receives as input identified line segment H and identified line segment V, which have satisfied testing, e.g., H and V intersect and satisfy one or more length ratio tests, and preliminary match group information 736, and which outputs an updated version of preliminary match group information 736. Operation starts in step 801 and proceeds to step 802. In step 802, a disjoint set union is performed between H and V and match group information is updated. Step 802 includes steps 804, 806, 808, 810, 812, 814, 816, 818 and 820. In step 804, it is determined whether or not identified line segment H belongs to an existing match group. If H belongs to an existing match group then operation proceeds from step 804, to step 810. However, if H does not belong to an existing match group then operation proceeds from step 804 to step 806.

In step 806, it is determined whether or not identified line segment V belongs to an existing match group. If V belongs to an existing match group then operation proceeds from step 806 to step 810. However, if V does not belong to an existing match group then operation proceeds from step 806 to step 808. In step 808, a new match group is created including identified line segment V and identified line segment H, e.g., a first match group is created.

Returning to step 810, in step 810 it is determined if only one of identified line segment H and identified line segment V belongs to an existing match group. If it is determined that only one of H and V belong to an existing match group, then operation proceeds from step 810 to step 812. However, if it is determined that both line segment H and line segment V already belong to a match group, then operation proceeds from step 810 to step 816.

Returning to step 812, in step 812, the existing match group to which one of H and V already belongs, is updated. Step 812 includes step 814 in which the other one of line segment H and line segment V which does not belong to an existing match group is added to the existing match group to which the one of line segment H and line segment V already belongs, e.g., the first match group is updated to include a new member.

Returning to step 816, in step 816, it is determined if identified line segment H and identified line segment V belong to different match groups or to the same match group. If the determination of step 816 is that H and V belong to different match groups, then operation proceeds from step 816 to step 818 in which the different match groups to which identified line segment H and identified line segment V already belong are merged, e.g., a second match group is merged into a first match group.

If in step 816 it is determined the H and V do not belong to different match groups, then operation proceeds from step 816 to step 820, in which no operation is performed regarding generating new match groups, updating match groups or merging match groups, since identified line segment H and identified line segment V already belong to the same existing match group.

Operation returns to step 732 and the preliminary match group information 736 has been updated if one of step 808, 814 or 818 was performed.

Operation proceeds from step 732 or step 733 to step 738. In step 738, a determination is performed as to whether or not there are additional identified horizontal and vertical line segment pairs to test for a match. If it is determined that there are additional pairs to test, then operation proceeds from step 738, via connecting node C 744 to step 704, in which an untested pair from identified Horizontal line segments 620 and identified vertical lines segments 622 is retrieved and processed.

If in step 732, it is determined that there are no additional pairs to test, e.g., each of the potential pairing combinations of one from identified horizontal line segment 620 and one from identified vertical line segments 622 has already been tested, then operation proceeds from step 738 to step 740.

In step 740, match groups from the preliminary match group information 736 are deleted which do not have at least 3 identified horizontal line segments and 3 identified vertical line segments as members of the group. In some embodiments, the criteria used for rejecting a match groups is different, e.g., a match group that does not include at least 2 identified horizontal line segments and at least 2 identified vertical line segments is rejected, or a match group that does not include at least 6 identified horizontal line segments and at least 6 identified vertical line segments is rejected. In some embodiments, different criteria for rejection is used regarding the minimum number of identified horizontal line segments and the minimum number of vertical line segments. The output from step 740 is match group information 632 which includes one or more match groups (match group 1 633, ..., match group M 635). In one example M=3.

Figure 9A:
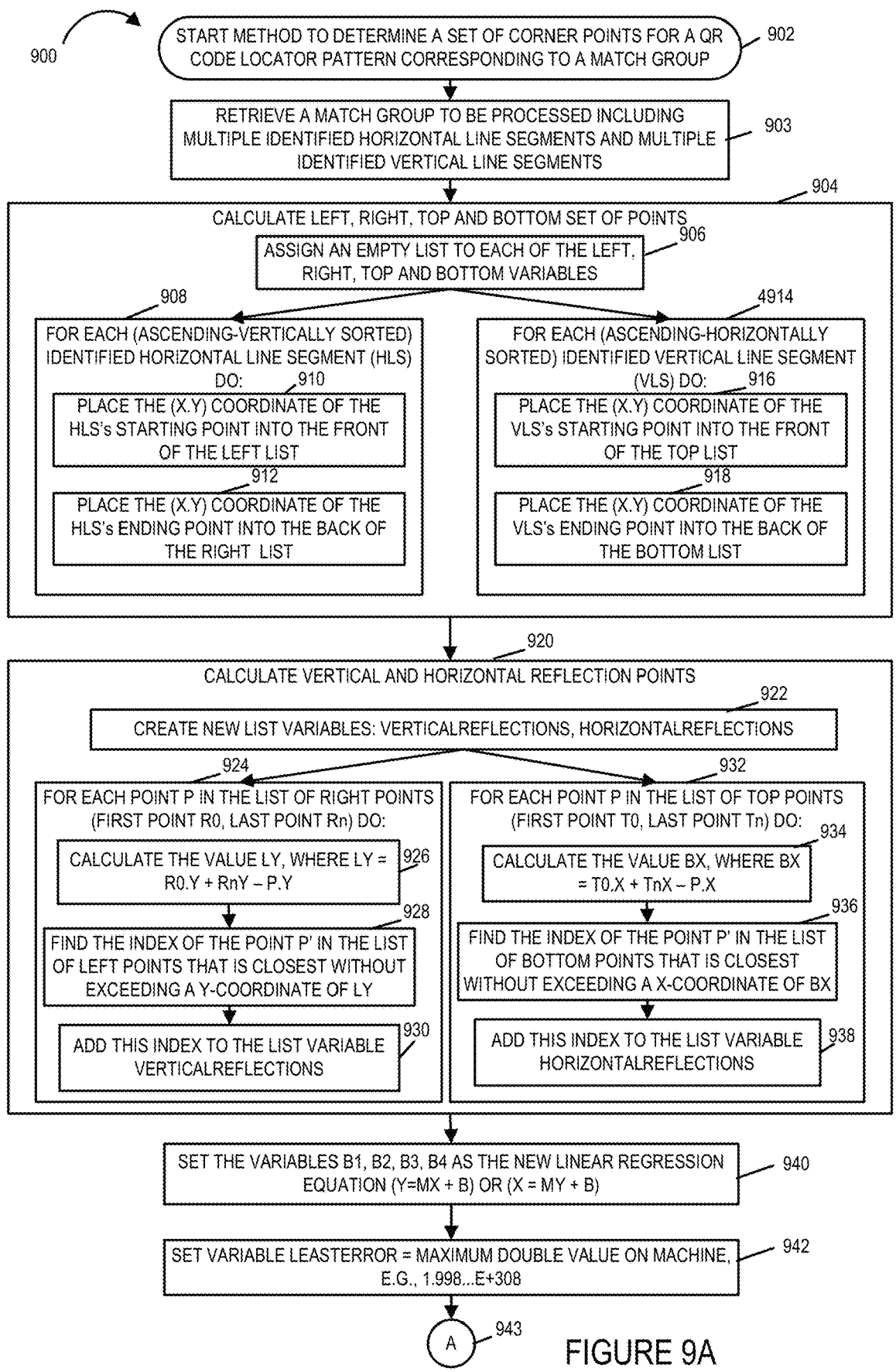
FIG. 9A is a first part of the flow chart of FIG. 9.
Figures 9, 9A, 9B:
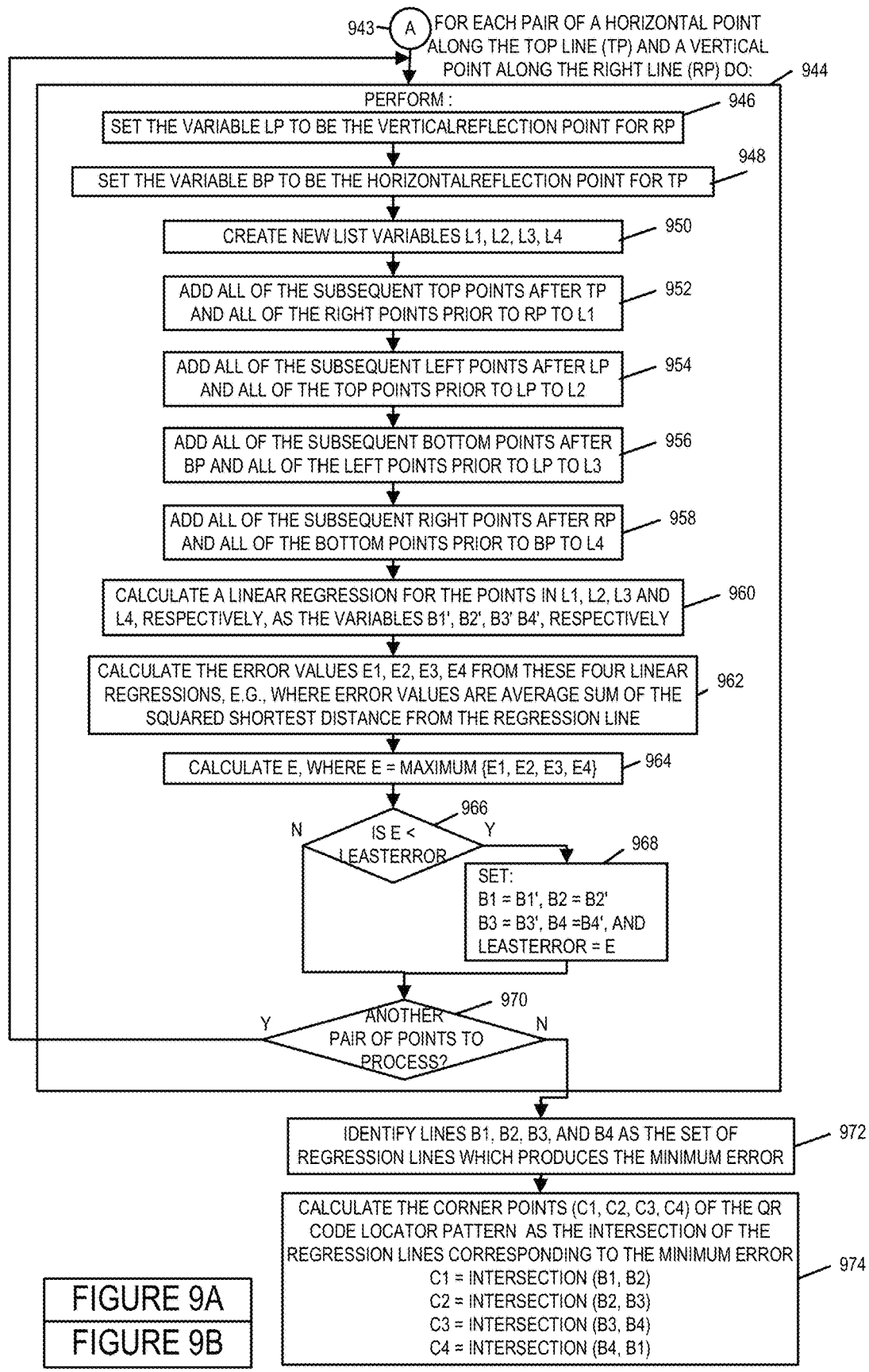
FIG. 9 shows how FIGS. 9A and 9B can be combined to form a complete flow chart which shows a method of determining a set of corner points of a QR code locator pattern that can be used in the method of FIG. 6.
FIG. 9B is a second part of the flow chart of FIG. 9.

FIG. 9, comprising the combination of FIG. 9A and FIG. 9B, is a flowchart 900 of an exemplary method of calculating the corner points of the outer square of a QR code locator pattern for a match group of identified horizontal line segments and identified vertical line segments in accordance with an exemplary embodiment. In various embodiments, the method of flowchart 900 is implemented multiple times as part of step 634 of flowchart 600. In some embodiments flowchart 900 is implemented as a subroutine that is called in step 638 and 646 to process a match group and return a set of corner points for a QR code locator pattern. For example, if are 3 match groups to be processed in step 634, each of the 3 iterations of flowchart 900 processes a different match group and obtains the corner points for one of the 3 QR code locator patterns in the received image including a QR code being processed.

Operation starts in step 902 and proceeds to step 903, in which a match group to be processed is received, the match group including multiple identified horizontal line segments and multiple identified vertical line segments. Operation proceeds from 903 to step 904. In step 904 left, right, top and bottom sets of points are calculated. Step 904 includes steps 906, 908 and 914. In step 906 an empty list is assigned to each of the left, right, top and bottom variables. Operation proceeds from step 906 to step 908 and step 914. In step 908, for each ascending—vertically sorted identified horizontal line segments (HLSs) of the match group being processed, steps 910 and 912 are performed. In step 910 the (X. Y) coordinate of the HLS's starting point is placed into the front of the left list. In step 912 the (X. Y) coordinate of the HLS's ending point is placed into the back of the right list. In step 914, for each ascending—horizontally sorted identified vertical line segments (VLSs) of the match group being processed, steps 916 and 918 are performed. In step 916 the (X. Y) coordinate of the VLS's starting point is placed into the front of the top list. In step 918 the (X. Y) coordinate of the VLS's ending point is placed into the back of the bottom list.

Operation proceeds from step 904 to step 920. In step 920 vertical and horizontal reflection points are calculated. Step 920 includes steps 922, 924 and 932. In step 922 new list variables: VERTICALREFLECTIONS and HORIZONTALREFLECTIONS are created. Operation proceeds from steps 922 to steps 924 and 932. In step 924, for each point P in the list of right points (FIRST POINT R0, LAST POINT Rn) steps 926, 928 and 930 are performed. In step 926, the value LY is calculated, where $LY=R0.Y+RnY-P.Y$. In step 928, the index if the point P' in the list of left points that is closest without exceeding a Y-coordinate of LY is found. In step 930, the found index of step 928 is added to the list of vertical reflections. In step 932, for each point P in the list of top points (FIRST POINT T0, LAST POINT Tn) steps 934, 936 and 938 are performed. In step 934, the value BX is calculated, where $BX=T0.X+TnX-P.X$. In step 936, the index if the point P' in the list of bottom points that is closest without exceeding a X-coordinate of BX is found. In step 938, the found index of step 936 is added to the list of horizontal reflections.

Operation proceeds from step 920 to step 940. In step 440, the variables B1, B2, B3, B4, are set as the new linear regression equation $(Y=MX+B)$ or $(X=MY+B)$. Operation proceeds from step 940 to step 942. In step 942, the variable LEASTERROR is set equal to the maximum double value on the machine being used to process, e.g., the variable LEASTERROR is set equal to 1.998 ... E+308. Operation proceeds from step 942, via connecting node A 943, to step 944. Step 944 is performed for each pair of a horizontal point along the top line (TP) and a vertical point along the right line (RP). Step 944 includes steps 946, 948, 950, 952, 954, 956, 958, 960, 962, 964, 966, 968, and 970. In step 946 the variable LP is set to be the VERTICALRELECTION point for RP. Operation proceeds from step 946 to step 948. In step 948 the variable BP is set to be the HORIZONTALREFLECTION point for TP. Operation proceeds from step 948 to step 950. In step 950 a new list of variables L1, L2, L3, L4 are created. Operation proceeds from step 950 to step 952. In step 952 all of the subsequent top points after TP and all of the right points prior to RP are added to L1. Operation proceeds from step 952 to step 954. In step 954 all of the subsequent left points after LP and all of the top points prior to LP are added to L2. Operation proceeds from step 954 to step 956. In step 956 all of the subsequent bottom points after BP and all of the left points prior to LP are added to L3. Operation proceeds from step 956 to step 958. In step 958 all of the subsequent right points after RP and all of the bottom points prior to BP are added to L4. Operation proceeds from step 958 to step 960.

In step 960, linear regressions are calculated for the points in L1, L2, L3, and L4, respectively, as the variables B1', B2', B3', B4', respectively. Thus in step 960 4 linear regressions are performed. Operation proceeds from step 960 to step 962.

In step 962, the error values E1, E2, E3, and E4 are calculated from the 4 linear regressions of step 960, e.g., where the error values are the average sum of the shortest distance from the regression line. Operation proceeds from step 962 to step 964.

In step 964, error E is calculated, where E=maximum (E1, E2, E3, E4). Operation proceeds from step 964 to step 966.

In step 966 error E is compared to the value of LEASTERROR. If E is less than the current value of LEASTERROR, then operation proceeds from step 966 to step 970; otherwise, operation proceeds from step 966 to step 968. In step 968, B1 is set equal to B1', B2 is set equal to B2', B3 is set equal to B3' and B4 is set equal to B4'. In step 968, LEASTERROR is set to the value of E. Operation proceeds from step 968 to step 970.

In step 970, a determination is made as to whether of not there is another pair of points to process, e.g., another horizontal point along the top line and another vertical point along the right line. If there is another pair of point to process then operation proceeds to the input of step 944. If the determination of step 970 is that there is not an additional pair of points to process, then operation proceeds from step 970 to step 972.

In step 972 the processing of step 944 returns the regression lines B1, B2, B3, B4 which were determined to produce the minimum error value. Operation proceeds from step 972 to step 974.

In step 974 the corner points, C1, C2, C3, and C4, of the QR code locator pattern are calculated, where C1=intersection of lines (B1, B2), C2=intersection of lines (B2, B3), C3=intersection of lines (B3, B4) and C4=intersection of lines (B4, B1). Points C1, C2, C3, and C4 are determined corner points of the outer square of a QR code locator pattern. The determined corner points C1, C2, C3 and C4, are returned to the step which called the routine of flowchart 900.

Figure 10:
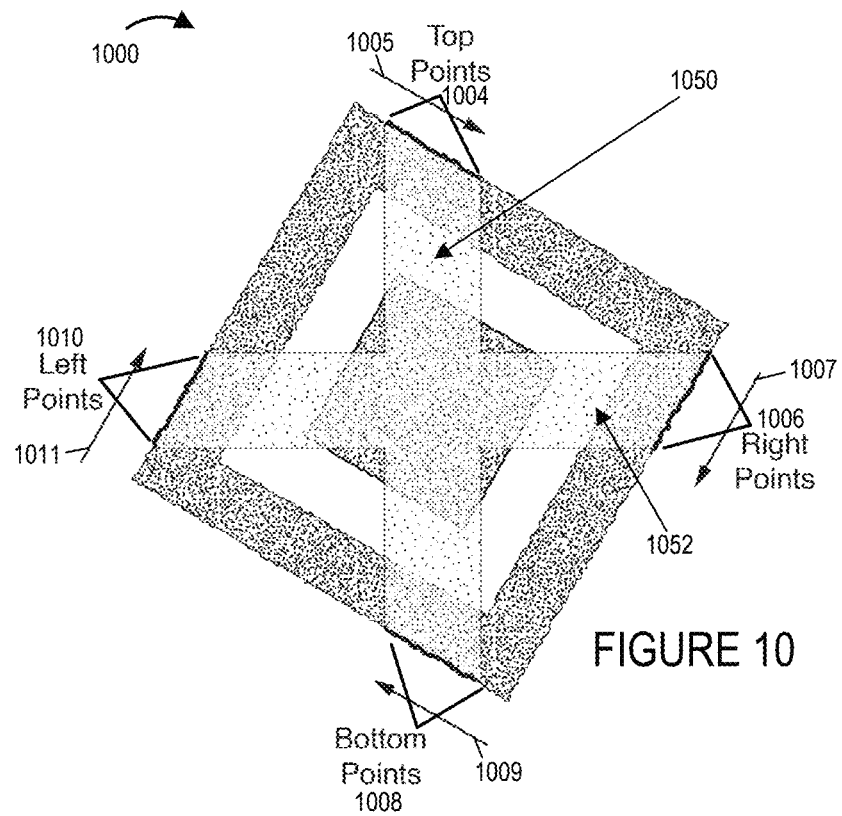
FIGS. 10, 11, 12, 13 and 14 are various figures used to help explain how corner points can be determined using the method shown in the flow chart of FIG. 9.

FIG. 10 is a drawing 1000 which shows the clockwise ordering of left/right/top and bottom points in one example. Drawing 1000 illustrates an exemplary QR code locator pattern which is being detected in accordance with an exemplary embodiment. Area 1050 identifies an area in which there are identified vertical line segments of the match group. Area 1052 identifies an area in which there are identified horizontal line segments of the match group. The ordering of the top points 1004 is indicated by arrow 1005. The ordering of the right points 1006 is indicated by arrow 1007. The ordering of the bottom points 1008 is indicated by arrow 1009. The ordering of the left points 1010 is indicated by arrow 1011. The left, right, top and bottom sets of points shown in FIG. 1000 may be calculated in accordance with step 904 of FIG. 9.

The overreaching goal is to find the set of four lines that best represent the points given with the left/top/right/bottom points. There is a problem in that the corner points can exist midway through the four sets of points. In order to overcome this problem, in some embodiments, a nested double loop over the points is initiated to determine what the best lines are that represent the sides. In some embodiments, a simple linear regression is used to test the error of each line.

Figure 11:
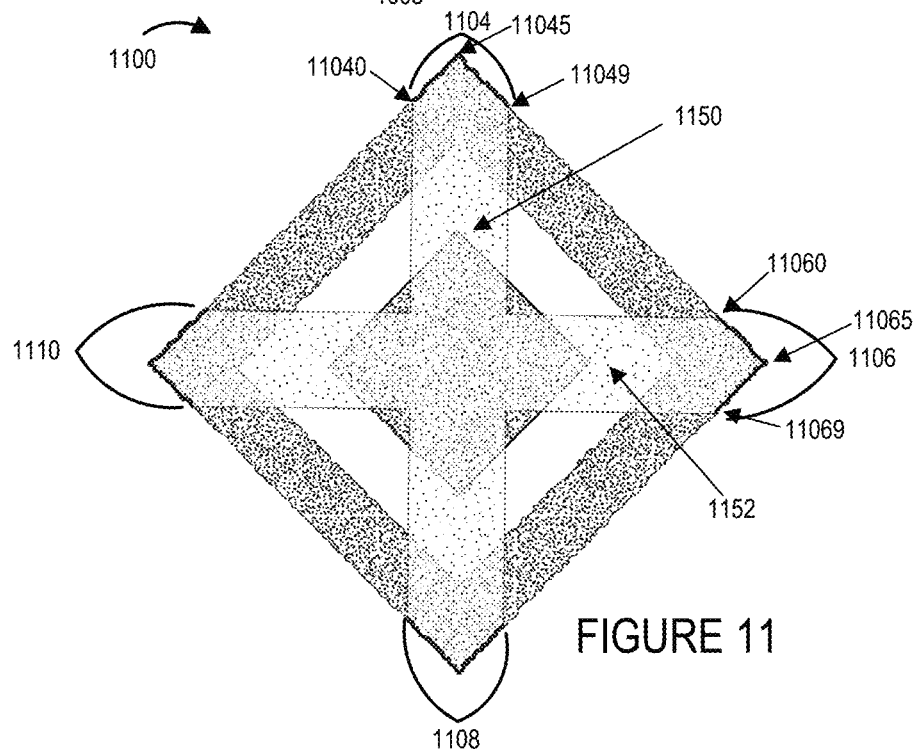

FIG. 11 is a drawing 1100 illustrating an example where the corners of the QR code locator pattern being detected exist midway through the left/right/top/bottom points. Area 1150 identifies an area in which there are identified vertical line segments of the match group. Area 1152 identifies an area in which there are identified horizontal line segments of the match group. The top points 1104 include a first top point 11040, a midway top point 11045 and an end top point 11049. The right points 1106 include a first right point 11060, a midway right point 11065 and an end right point 11069. There are also bottom points 1108 and left point 1110. The left, right, top and bottom sets of points shown in FIG. 1100 may be calculated in accordance with step 904 of FIG. 9.

To create reflection points the procedure of step 920 of FIG. 9 is implemented. In simple terms, this procedure finds each matching point in the opposing group of points (i.e. left from right, bottom from top) such that it is as close as possible to being a reflection across the center of the square. What is created are matching pairs basically, for example: Right[0] matches Left [0] best; Right [1] matches Left [1] best, etc. Then, before iterating over the point pairs, new variables are initialized in steps 940 and 942 of FIG. 9. Then, the steps of FIG. 9B are performed and the output is a set of four values which are the corner points of the QR code locator pattern.

Figure 12:
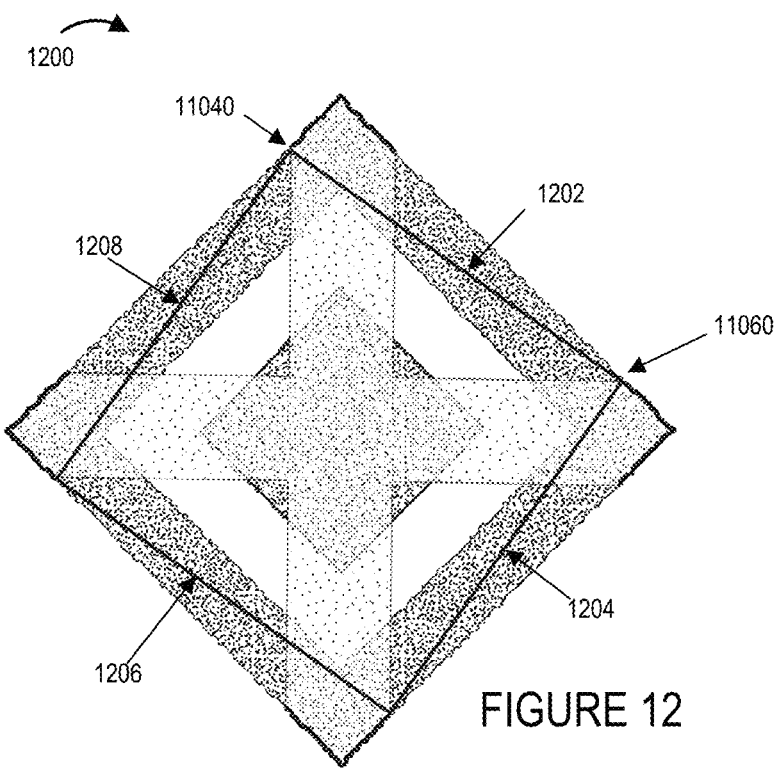
Figure 13:
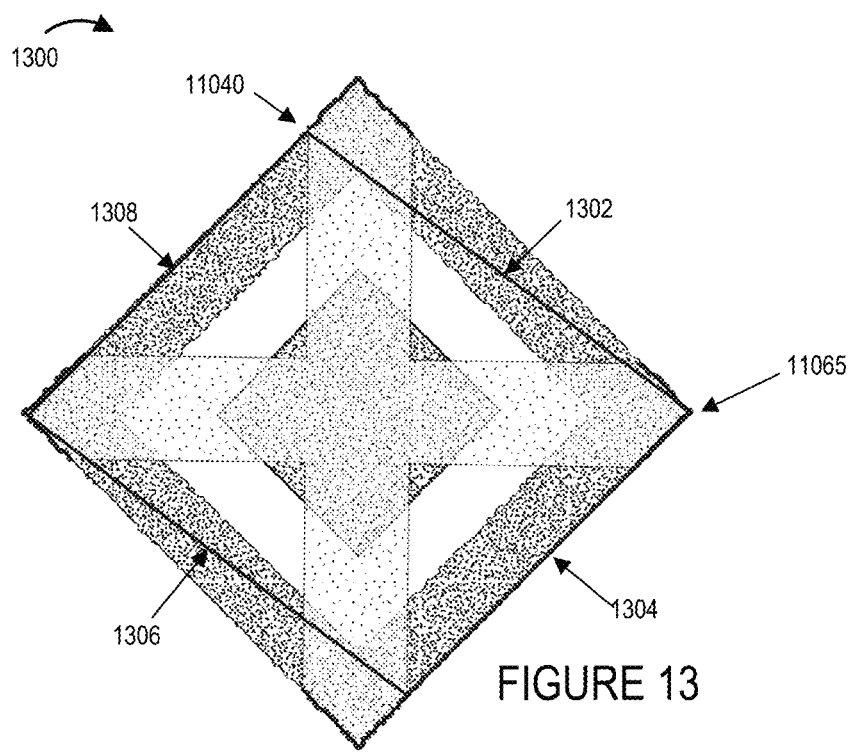
Figure 14:
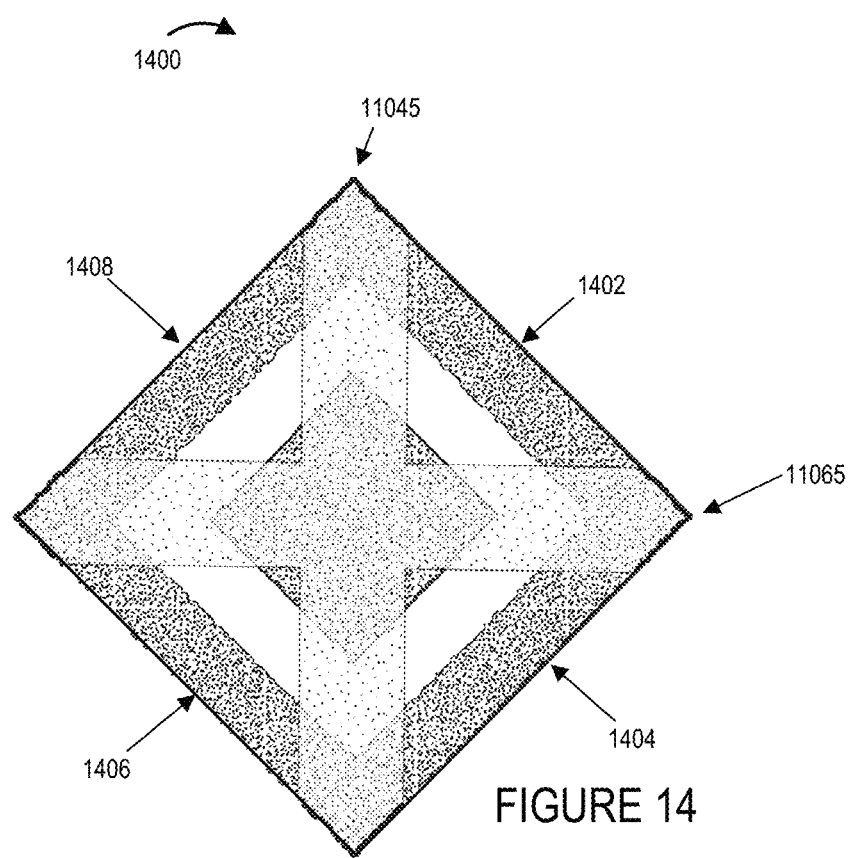

FIGS. 12-14 illustrate the best line fitting procedure. Each line starts at the beginning of the top set of points and the right set of points and reflects along the bottom and left, respectively. Consider that the QR code locator pattern is the same as in FIG. 11.

FIG. 12 includes drawing 1200 which illustrates one iteration, e.g., of step 944, in which line 1202 starts at the beginning point 11040 of the top set of points 1104 and ends at the beginning point 11060 of the right set of points 1106. In FIG. 12 line 1204 starts at the beginning point 11060 of the right set of points 1106. Reflection lines 1206 and 1208 are also shown. This set of lines 1202, 1204, 1206, 1208, does not represent the square well and the errors between the lines 1202, 1204, 1206, 1208 and the sets of points (1104, 1106, 1108, 1110) will be large.

FIG. 13 includes drawing 1300 which illustrates another iteration, e.g., of step 944, in which line 1302 starts at the beginning point 11040 of the top set of points 1104 and ends at the midway point 11065 of the right set of points 1106. In FIG. 13 line 1304 start at the midway point 11065 of the right set of points 1106. Reflection lines 1306 and 1308 are also shown. This set of lines 1302, 1304, 1306, 1308, is better than the FIG. 12 set of lines but does not represent the square well and the errors between the top and bottom points and the lines are large, although the error is low on the left and right.

FIG. 14 includes drawing 1400 which illustrates another iteration, e.g., of step 944, in which line 1402 starts at the midway point 11045 of the top set of points 1104 and ends at the midway point 11065 of the right set of points 1106. In FIG. 14 line 1404 starts at the midway point 11065 of the right set of points 1106. Reflection lines 1406 and 1408 are also shown. At this point in the testing, the top point is midway through, at the corner point and the right point is also midway through. Given that these positions also match the corners of the square, this results in the least error in the four linear regressions between the points. Although processing will continue with the rest of the points, this set of lines 1402, 1404, 1406, 1408, is the best fit and will be returned, e.g., in step 972 of flowchart 900. From these four lines 1402, 1404, 1406, and 1408, the four corner points are calculated in step 974 and returned as the result.

Figure 15:
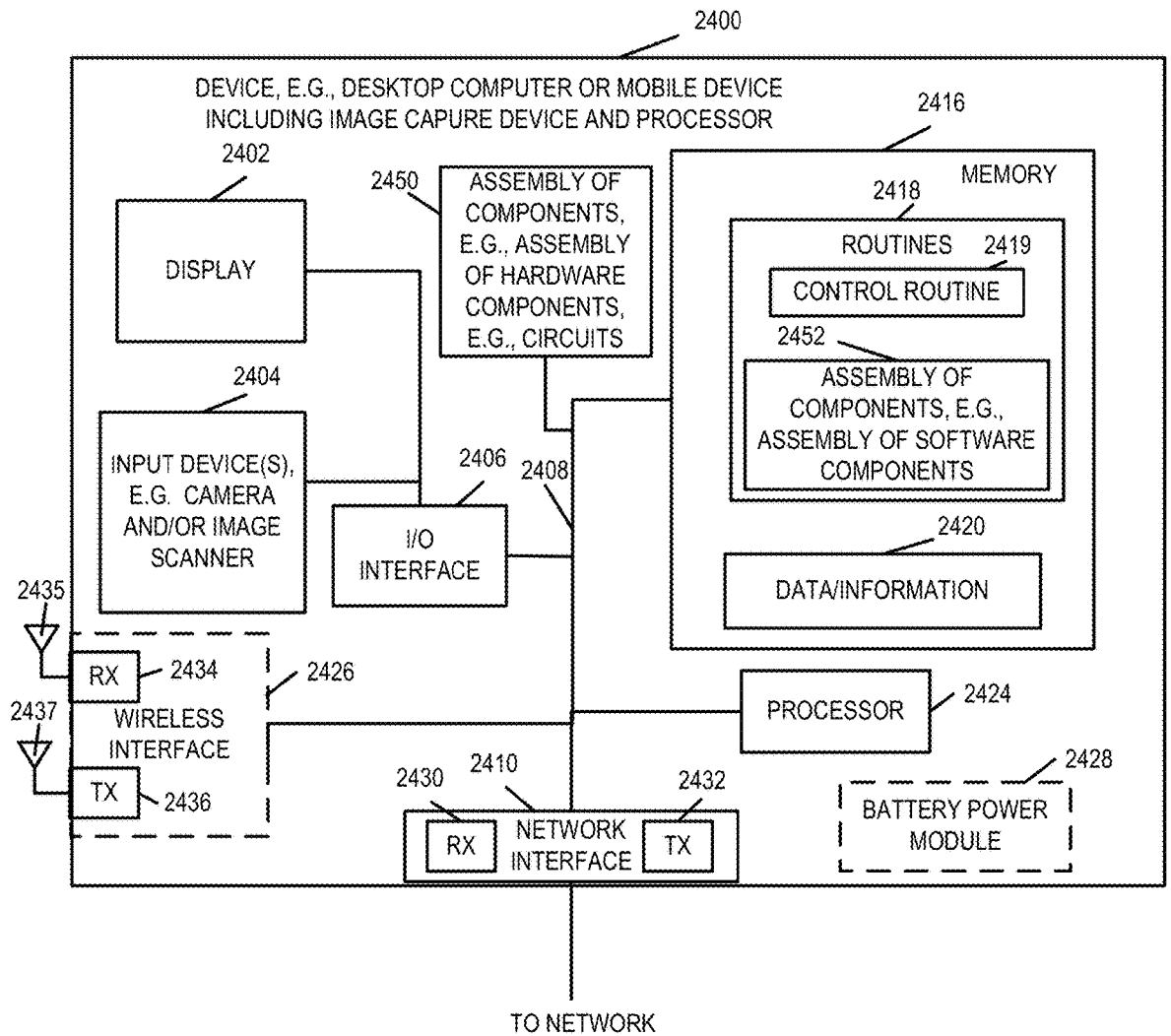
FIG. 15 shows an exemplary system for implementing the methods of the present invention.

FIG. 15 illustrates an exemplary device 2400, e.g., a desktop personal computer or a mobile device including processing capability, for processing image data implemented in accordance with an exemplary embodiment. The device 2400 can be and sometimes is used to implement the steps of the various methods and/or routines shown in the various flow charts included in the present application. The exemplary device 2400 includes a display 2402, input device(s) 2404, memory 2416, processor 2424, e.g., a CPU, I/O interface 2406, assembly of components 2450, e.g., an assembly of hardware components, e.g., circuits, and network interface 2410. In some embodiments, device 2400 also includes a wireless interface 2426 for supporting wireless communications and a battery power module 2428 for operating the device 2400 on battery power. Network interface 2410 includes a receiver 2430 and a transmitter 2432. Wireless interface 2426 includes a wireless receiver 2434 coupled to receive antenna 2435 and a wireless transmitter 2436 coupled to a transmit antenna 2437.

Input device(s) 2404 includes, e.g. a scanner, camera, keyboard, keypad, touch screen, mouse, and/or other user input devices. The display 2402 and input devices 2404 are coupled to a bus 2408 by I/O interface 2406. The bus 2408 is also coupled to the memory 2416, processor 2424, assembly of hardware components 2450, and network interface 2410. The network interface 2410 couples the internal components of the device 2400 to an external network, e.g., the Internet, thereby allowing the device 2400 to receive and send data over a network. Alternatively, or in addition, wireless interface 2426 which includes a wireless transmitter 2436 and a wireless receiver 2434, couples device 2400 to other wireless devices and/or a wireless communications network.

Memory 2416 includes routines 2418 and data/information 2420. Routines 2418 include a control routine 2419 and an assembly of components 2452, e.g., an assembly of software components. In some embodiments, the control routine 2419 causes the device 2400 to implement the steps of the methods of flowcharts of FIGS. 6, 7, 8 and 9. Processor 2424 controls operation of the device 2400 under the directions of components, e.g., software components, and/or routines, e.g., control routine 2419, stored in memory 2416. In various embodiments, processor 2424 is configured to implement the methods shown in the flow charts of FIGS. 6, 7, 8 and 9.

Figure 16:
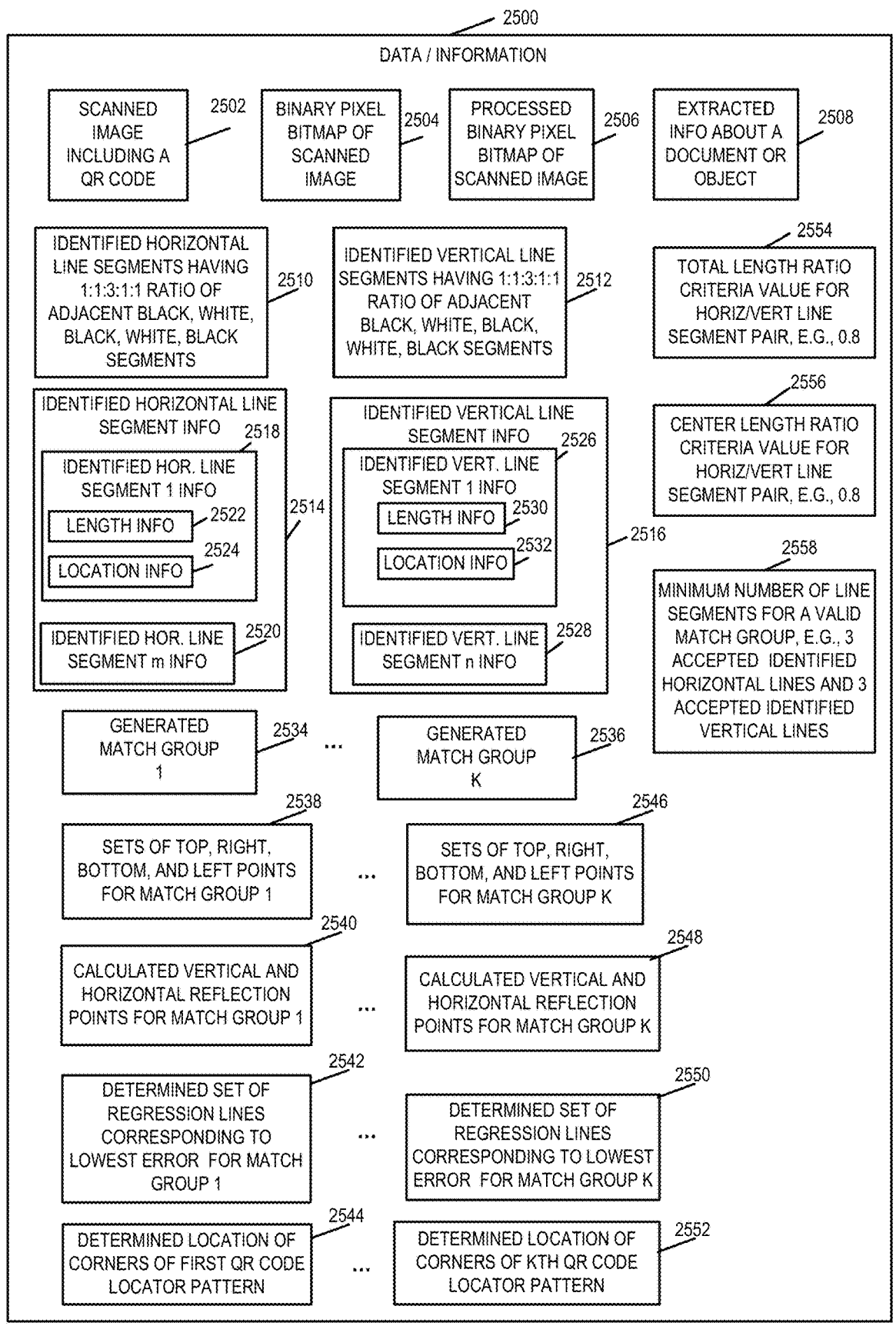
FIG. 16 shows exemplary data/information which may be included in the system of FIG. 15 which is implementing the methods of the present invention.

FIG. 16 is a drawing of exemplary data/information 2500 in accordance with an exemplary embodiment. Data/information 2500 is, e.g., data/information 2420 of device 2400 of FIG. 15. Data/information 2500 includes a scanned image including a QR code 2502, a binary pixel bitmap of the scanned image 2504, a processed binary pixel bitmap of the scanned image 2506, and extracted information about a document of object 2508. Data/information further includes identified horizontal line segments having a 1:1:3:1:1 ratio of adjacent black, white, black, white, black segments 2510, identified vertical line segments having a 1:1:3:1:1 ratio of adjacent black, white, black, white, black segments 2512, identified horizontal line segment information 2514 and identified vertical line segment information 2516.

Identified horizontal line segment information 2514 includes information corresponding to each of the identified horizontal line segments (identified horizontal line segment 1 information 2518, . . . , identified horizontal line segment m information 2520). Identified horizontal line segment 1 information 2518 includes length information 2522, e.g., total length information and middle segment length information, and location information 2524. Identified vertical line segment information 2516 includes information corresponding to each of the identified vertical line segments (identified vertical line segment 1 information 2526, . . . , identified vertical line segment n information 2528). Identified vertical line segment 1 information 2526 includes length information 2530, e.g., total length information and middle segment length information, and location information 2532.

Data/information 2500 further includes generated match groups (generated match group 1 2534, . . . , generated match group K 2536). Data/information 2500 further includes sets of top, right, bottom and left points for match group 1 2538, calculated vertical and horizontal reflection points for match group 1 2540, a determined set of regression lines corresponding to the lowest error for match group 1 2542, and the determined locations of the corners of the first QR code location pattern which corresponds to match group 1 2544. Data/information 2500 further includes sets of top, right, bottom and left points for match group K 2546, calculated vertical and horizontal reflection points for match group k 2548, a determined set of regression lines corresponding to the lowest error for match group k 2550, and the determined locations of the corners of the Kth QR code location pattern which corresponds to match group K 2552.

Data/information 2500 further includes a total length ratio criteria value for horizontal/vertical line segment pair match group acceptance testing 2552, e.g., a value of 0.8, a center length ratio criteria value for horizontal/vertical line segment pair match group acceptance testing 2554, e.g., a value of 0.8, and a minimum number of identified lines segments for a valid match group 2556, e.g., at least 3 accepted identified horizontal line segments and at least 3 accepted identified vertical line segments.

NUMBERED LIST OF EXEMPLARY
EMBODIMENTS

Method Embodiment 1

A method of processing image data, the method comprising: processing a binary pixel bitmap of a scanned object to remove pixel noise, said processing producing a processed binary pixel bitmap of the scanned object; identifying in the processed binary pixel bitmap horizontal line segments having an expected ratio of adjacent black, white, black, white, black segments; identifying in the processed binary pixel bitmap vertical line segments having the expected ratio of adjacent black, white, black, white, black segments; determining from the identified horizontal and vertical line segments locations of corners of at least a first QR code locator pattern; and reading a first QR code on the scanned object in which said first QR code locator pattern is included using the locations of the corners of the first QR code locator pattern as a guide to the position of the QR code on the scanned object.

Method Embodiment 2

The method of Method Embodiment 1, wherein said scanned object is a document or box, wherein the expected ratio of adjacent black, white, black, white, black segments is 1:1:3:1:1; and wherein reading the first QR code on the scanned object includes extracting information about the document or object from the binary pixel bitmap of the scanned object which includes the first QR code.

Method Embodiment 3

The method of Method Embodiment 1, wherein processing the binary pixel bitmap of a scanned object to remove pixel noise includes replacing individual white pixels which have immediately adjacent black pixels on four sides (e.g., left, right, top and bottom) with black pixels.

Method Embodiment 4

The method of Method Embodiment 1, wherein processing the binary pixel bitmap of a scanned object to remove pixel noise includes leaving black pixels unchanged.

Method Embodiment 5

The method of Method Embodiment 4, wherein processing the binary pixel bitmap of a scanned object to remove pixel noise includes leaving groups of two or more white pixels adjacent each other unchanged.

Method Embodiment 6

The method of Method Embodiment 1, further comprising: storing the location and length of each identified horizontal line segment; and storing the location and length of each identified vertical line segment.

Method Embodiment 7

The method of Method Embodiment 3, wherein determining from the identified horizontal and vertical line segments locations of corners of at least a first QR code locator pattern includes: generating at least a first match group corresponding to a QR code locator pattern by grouping identified line segments that contact each other together; and determining from the line segments in the first match group the corners of the first QR code locator pattern.

Method Embodiment 8

The method of Method Embodiment 7, generating at least a first match group corresponding to a QR code locator pattern by grouping identified line segments that contact each other together includes: determining if a first identified horizontal line segment intersects a first identified vertical line segment.

Method Embodiment 9

The method of Method Embodiment claim 8, further comprising: in response to determining that the first identified horizontal line segment intersect the first identified vertical line segment, checking that black center portions of the first horizontal line segment and black center portion of the first vertical line segment have lengths which are within a predetermined range of each other.

Method Embodiment 10

The method of Method Embodiment 9 wherein said predetermined range is 80% to 100%, the smaller center portion of the vertical line segment or horizontal line segment having a length which is greater than or equal 0.8 the length of the larger center portion of the vertical line segment or horizontal line segment.

Method Embodiment 11

The method of Method Embodiment 10, wherein the first identified horizontal line segment and the first identified vertical line segment satisfied said check; and wherein said generating at least a first match group corresponding to a QR code locator pattern further includes: starting the first match group by including in the first match group the first identified horizontal line segment and first identified vertical line segment in the first match group.

Method Embodiment 12

The method of Method Embodiment 9, wherein the first identified horizontal line segment and the first identified vertical line segment satisfied said check; and wherein said generating at least a first match group corresponding to a QR code locator pattern further includes: updating the first match group by including one of the first identified horizontal line segment and the first identified vertical line segment in the first match group.

Method Embodiment 13

The method of Method Embodiment 9, wherein the first identified horizontal line segment and the first identified vertical line segment satisfied said check; and wherein said generating at least a first match group corresponding to a QR code locator pattern further includes: updating the first match group including merging a second match group into the first match group, said second match group including one of the first identified horizontal line segment and the first identified vertical line segment.

Method Embodiment 14

The method of Method Embodiment 1, wherein determining from the identified horizontal and vertical line segments locations of corners of at least a first QR code locator pattern includes: processing a first match group including at least three identified vertical line segments and three identified horizontal line segments.

Method Embodiment 15

The method of Method Embodiment 14, wherein said processing the first match group includes performing multiple iterative linear regressions.

Device Embodiment 16

A device comprising: a camera or scanner for generating (e.g., by capturing an image of the portion of the object) a binary pixel bitmap of a portion of an object including a locator pattern; memory for storing the binary pixel map; a processor, coupled to said memory, the processor being configured to: processes the binary pixel bitmap to remove pixel noise, said processing producing a processed binary pixel bitmap; identify, in the processed binary pixel bitmap, horizontal line segments having an expected ratio of adjacent black, white, black, white, black segments; identify, in the processed binary pixel bitmap, vertical line segments having the expected ratio of adjacent black, white, black, white, black segments; determine from the identified horizontal and vertical line segments locations of corners of at least a first QR code locator pattern; and reading a first QR code on the scanned object in which said first QR code locator pattern is included using the locations of the corners of the first QR code locator pattern as a guide to the position of the QR code on the scanned object.

Device Embodiment 17

The device of Device Embodiment 16, wherein said object is a document or box; wherein the expected ratio of adjacent black, white, black, white, black segments is 1:1:3:1:1; and wherein reading the first QR code on the scanned object includes extracting information about the document or object from the binary pixel bitmap of the scanned object which includes the first QR code.

Device Embodiment 18

The device of Device Embodiment 16, wherein said processor is further configured to: replace, as part of process the binary pixel bitmap to remove pixel noise, individual white pixels, which have immediately adjacent black pixels on four sides (e.g., left, right, top and bottom), with black pixels.

Device Embodiment 19

The device of Device Embodiment 16, wherein the processor is further configured to: leave black pixels unchanged when processing the binary pixel bitmap to remove pixel noise.

Device Embodiment 20

The device of Device Embodiment 19, wherein the processor if further configured to: leave groups of two or more white pixels adjacent each other unchanged when processing the binary pixel bitmap to remove pixel noise.

Device Embodiment 21

The device of Device Embodiment 16, wherein the processor is further configured to: store in said memory the location and length of each identified horizontal line segment; and store, in said memory, the location and length of each identified vertical line segment.

Device Embodiment 22

The device of Device Embodiment 18, wherein said processor is configured, as part of determining from the identified horizontal and vertical line segments locations of corners of at least a first QR code locator pattern, to: generate at least a first match group corresponding to a QR code locator pattern by grouping identified line segments that contact each other together; and determine from the line segments in the first match group the corners of the first QR code locator pattern.

Device Embodiment 23

The device of Device Embodiment 21, wherein the processor is configured, as part of generating at least a first match group corresponding to a QR code locator pattern by grouping identified line segments that contact each other together, to: determine if a first identified horizontal line segment intersects a first identified vertical line segment.

Device Embodiment 24

The device of Device Embodiment 23, wherein the processor is further configured, in response to determining that the first identified horizontal line segment intersect the first identified vertical line segment, to: check that black center portions of the first horizontal line segment and black center portion of the first vertical line segment have lengths which are within a predetermined range of each other.

Device Embodiment 25

The device of Device Embodiment 24, wherein said predetermined range is 80% to 100%, the smaller center portion of the vertical line segment or horizontal line segment having a length which is greater than or equal 0.8 the length of the larger center portion of the vertical line segment or horizontal line segment.

Device Embodiment 26

The device of Device Embodiment 24, wherein the first identified horizontal line segment and the first identified vertical line segment satisfied said check; and wherein the processor is further configures, as part of generating at least a first match group corresponding to a QR code locator pattern, to: starting the first match group by including in the first match group the first identified horizontal line segment and first identified vertical line segment in the first match group.

Device Embodiment 27

The device of Device Embodiment 24, wherein the first identified horizontal line segment and the first identified vertical line segment satisfied said check; and wherein said processor is further configured, as part of generating at least a first match group corresponding to a QR code locator pattern, to: update the first match group by including one of the first identified horizontal line segment and the first identified vertical line segment in the first match group.

Device Embodiment 28

The device of Device Embodiment 24, wherein when the first identified horizontal line segment and the first identified vertical line segment satisfied said check, the processor is further configured, as part of generating at least a first match group corresponding to: update the first match group by merging a second match group into the first match group, said second match group including one of the first identified horizontal line segment and the first identified vertical line segment.

Device Embodiment 29

The device of Device Embodiment 16, wherein said processor is further configured, as part of determining from the identified horizontal and vertical line segments locations of corners of at least a first QR code locator pattern to: processes a first match group including at least three identified vertical line segments and three identified horizontal line segments.

Device Embodiment 30

The device of Device Embodiment 29, wherein the processor, is configured to: perform multiple iterative linear regressions as part of processing the first match group.

Computer Readable Medium Embodiment 31

A non-transitory computer readable medium, comprising processor executable instructions which when executed by a processor control the processor to: process a binary pixel bitmap of a scanned object to remove pixel noise, said processing producing a processed binary pixel bitmap of the scanned object; identify in the processed binary pixel bitmap horizontal line segments having an expected ratio of adjacent black, white, black, white, black segments; identify in the processed binary pixel bitmap vertical line segments having the expected ratio of adjacent black, white, black, white, black segments; determine from the identified horizontal and vertical line segments locations of corners of at least a first QR code locator pattern; and read a first QR code on the scanned object in which said first QR code locator pattern is included using the locations of the corners of the first QR code locator pattern as a guide to the position of the QR code on the scanned object.

The techniques of various embodiments may be implemented using software, hardware and/or a combination of software and hardware. Various embodiments are directed to apparatus, e.g., an image processing device or system. Various embodiments are also directed to methods, e.g., a method of locating a target pattern within an image. Various embodiments are also directed to machine, e.g., computer, readable medium, e.g., ROM, RAM, CDs, hard discs, etc., which include machine readable instructions for controlling a machine to implement one or more steps of a method.

In various embodiments apparatus described herein are implemented using one or more components to perform the steps corresponding to one or more methods. Thus, in some embodiments various features are implemented using components. Such components may be implemented using software, hardware or a combination of software and hardware. In some embodiments in which the components are implemented in hardware, the components are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s). Each of the steps of the method maybe and sometimes are implemented by a circuit with different circuits being used for each of the different steps in some but not all embodiments.

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments the image processing device is a portable device including a camera, e.g., a cell phone including a cameral with a processor that implements the method.

In some embodiments components are implemented using software, in other embodiments components are implemented in hardware, in still other embodiments the components are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of processing image data, the method comprising:
   processing a binary pixel bitmap of a scanned object to remove pixel noise, said processing producing a processed binary pixel bitmap of the scanned object, wherein processing the binary pixel bitmap of a scanned object to remove pixel noise includes replacing individual white pixels, which have immediately adjacent black pixels on four sides, with black pixels;
   identifying in the processed binary pixel bitmap horizontal line segments having an expected ratio of adjacent black, white, black, white, black segments;
   identifying in the processed binary pixel bitmap vertical line segments having the expected ratio of adjacent black, white, black, white, black segments;
   determining from the identified horizontal and vertical line segments locations of corners of at least a first QR code locator pattern; and
   reading a first QR code on the scanned object in which said first QR code locator pattern is included using the locations of the corners of the first QR code locator pattern as a guide to the position of the QR code on the scanned object.

2. The method of claim 1, wherein determining from the identified horizontal and vertical line segments locations of corners of at least a first QR code locator pattern includes:
   generating at least a first match group corresponding to a QR code locator pattern by grouping identified line segments that contact each other together; and
   determining from the line segments in the first match group the corners of the first QR code locator pattern.

3. The method of claim 2, wherein generating at least a first match group corresponding to a QR code locator pattern by grouping identified line segments that contact each other together includes:
   determining if a first identified horizontal line segment intersects a first identified vertical line segment.

4. The method of claim 3, further comprising:
   in response to determining that the first identified horizontal line segment intersects the first identified vertical line segment, checking that black center portions of the first horizontal line segment and black center portion of the first vertical line segment have lengths which are within a predetermined range of each other.

5. The method of claim 4, wherein said predetermined range is 80% to 100%, the smaller center portion of the vertical line segment or horizontal line segment having a length which is >=0.8 the length of the larger center portion of the vertical line segment or horizontal line segment.

6. The method of claim 5, wherein the first identified horizontal line segment and the first identified vertical line segment satisfied said check; and
   wherein said generating at least a first match group corresponding to a QR code locator pattern further includes:
   starting the first match group by including in the first match group the first identified horizontal line segment and first identified vertical line segment in the first match group.

7. The method of claim 4, wherein the first identified horizontal line segment and the first identified vertical line segment satisfied said check; and
   wherein said generating at least a first match group corresponding to a QR code locator pattern further includes:
   updating the first match group by including one of the first identified horizontal line segment and the first identified vertical line segment in the first match group.

8. The method of claim 4, wherein the first identified horizontal line segment and the first identified vertical line segment satisfied said check; and
   wherein said generating at least a first match group corresponding to a QR code locator pattern further includes:
   updating the first match group including merging a second match group into the first match group, said second match group including one of the first identified horizontal line segment and the first identified vertical line segment.

9. The method of claim 1, wherein determining from the identified horizontal and vertical line segments locations of corners of at least a first QR code locator pattern includes:
   processing a first match group including at least three identified vertical line segments and three identified horizontal line segments.

10. The method of claim 1, wherein said scanned object is a document or box;
    wherein the expected ratio of adjacent black, white, black, white, black segments is 1:1:3:1:1; and
    wherein reading the first QR code on the scanned object includes extracting information about the document or object from the binary pixel bitmap of the scanned object which includes the first QR code.

11. A method of processing image data, the method comprising:
    processing a binary pixel bitmap of a scanned object to remove pixel noise, said processing producing a processed binary pixel bitmap of the scanned object, wherein processing the binary pixel bitmap of a scanned object to remove pixel noise includes leaving black pixels unchanged;
    identifying in the processed binary pixel bitmap horizontal line segments having an expected ratio of adjacent black, white, black, white, black segments;
    identifying in the processed binary pixel bitmap vertical line segments having the expected ratio of adjacent black, white, black, white, black segments;
    determining from the identified horizontal and vertical line segments locations of corners of at least a first QR code locator pattern; and
    reading a first QR code on the scanned object in which said first QR code locator pattern is included using the locations of the corners of the first QR code locator pattern as a guide to the position of the QR code on the scanned object.

12. The method of claim 11, wherein processing the binary pixel bitmap of a scanned object to remove pixel noise includes leaving groups of two or more white pixels adjacent each other unchanged.

13. The method of claim 11, wherein said scanned object is a document or box;
    wherein the expected ratio of adjacent black, white, black, white, black segments is 1:1:3:1:1; and
    wherein reading the first QR code on the scanned object includes extracting information about the document or object from the binary pixel bitmap of the scanned object which includes the first QR code.

14. A method of processing image data, the method comprising:
    processing a binary pixel bitmap of a scanned object to remove pixel noise, said processing producing a processed binary pixel bitmap of the scanned object;
    identifying in the processed binary pixel bitmap horizontal line segments having an expected ratio of adjacent black, white, black, white, black segments;
    identifying in the processed binary pixel bitmap vertical line segments having the expected ratio of adjacent black, white, black, white, black segments;
    determining from the identified horizontal and vertical line segments locations of corners of at least a first QR code locator pattern, wherein determining from the identified horizontal and vertical line segments locations of corners of at least a first QR code locator pattern includes: processing a first match group including at least three identified vertical line segments and three identified horizontal line segments, wherein said processing the first match group includes performing multiple iterative linear regressions; and
    reading a first QR code on the scanned object in which said first QR code locator pattern is included using the locations of the corners of the first QR code locator pattern as a guide to the position of the QR code on the scanned object.

15. The method of claim 14, wherein said scanned object is a document or box;
    wherein the expected ratio of adjacent black, white, black, white, black segments is 1:1:3:1:1; and
    wherein reading the first QR code on the scanned object includes extracting information about the document or object from the binary pixel bitmap of the scanned object which includes the first QR code.

16. A device, the device comprising:
    a camera or scanner for generating a binary pixel bitmap of a portion of an object including a locator pattern;
    memory for storing the binary pixel map;
    a processor, coupled to said memory, configured to:
    process the binary pixel bitmap to remove pixel noise, said processing producing a processed binary pixel bitmap, said processing including replacing individual white pixels, which have immediately adjacent black pixels on four sides, with black pixels;
    identify, in the processed binary pixel bitmap, horizontal line segments having an expected ratio of adjacent black, white, black, white, black segments;
    identify, in the processed binary pixel bitmap, vertical line segments having the expected ratio of adjacent black, white, black, white, black segments;
    determine from the identified horizontal and vertical line segments locations of corners of at least a first QR code locator pattern; and
    read a first QR code on the scanned object in which said first QR code locator pattern is included using the locations of the corners of the first QR code locator pattern as a guide to the position of the QR code on the scanned object.

17. The device of claim 16, wherein said processor is configured, as part of determining from the identified horizontal and vertical line segments locations of corners of at least a first QR code locator pattern, to:
    generate at least a first match group corresponding to a QR code locator pattern by grouping identified line segments that contact each other together; and determine from the line segments in the first match group the corners of the first QR code locator pattern.

18. The device of claim 17, wherein the processor is configured, as part of generating at least a first match group corresponding to a QR code locator pattern to:
determine if a first identified horizontal line segment intersects a first identified vertical line segment.

19. A device, the device comprising:
a camera or scanner for generating a binary pixel bitmap of a portion of an object including a locator pattern;
memory for storing the binary pixel map;
a processor, coupled to said memory, configured to:
process the binary pixel bitmap to remove pixel noise, said processing producing a processed binary pixel bitmap;
leave black pixels unchanged when processing the binary pixel bitmap to remove pixel noise;
identify, in the processed binary pixel bitmap, horizontal line segments having an expected ratio of adjacent black, white, black, white, black segments;
identify, in the processed binary pixel bitmap, vertical line segments having the expected ratio of adjacent black, white, black, white, black segments;
determine from the identified horizontal and vertical line segments locations of corners of at least a first QR code locator pattern; and
read a first QR code on the scanned object in which said first QR code locator pattern is included using the locations of the corners of the first QR code locator pattern as a guide to the position of the QR code on the scanned object.

20. A non-transitory computer readable medium, comprising processor executable instructions which when executed by a processor control the processor to:
process a binary pixel bitmap of a scanned object to remove pixel noise, said processing producing a processed binary pixel bitmap of the scanned object, wherein processing the binary pixel bitmap of a scanned object to remove pixel noise includes replacing individual white pixels, which have immediately adjacent black pixels on four sides, with black pixels;
identify in the processed binary pixel bitmap horizontal line segments having an expected ratio of adjacent black, white, black, white, black segments;
identify in the processed binary pixel bitmap vertical line segments having the expected ratio of adjacent black, white, black, white, black segments;
determine from the identified horizontal and vertical line segments locations of corners of at least a first QR code locator pattern; and
read a first QR code on the scanned object in which said first QR code locator pattern is included using the locations of the corners of the first QR code locator pattern as a guide to the position of the QR code on the scanned object.

* * * * *